United States Patent [19]
Schreiber

[11] Patent Number: 6,043,483
[45] Date of Patent: Mar. 28, 2000

[54] APPARATUS AND METHOD USING AN INDEXED-ENCODER TO SENSE THE ABSOLUTE POSITION OF AN OBJECT WITH A SINGLE SET OF OPTICS

[75] Inventor: Charles T. Schreiber, Reno, Nev.

[73] Assignee: Radica China Limited, The Hong Kong Special Administrative Region of the People's Republic of China

[21] Appl. No.: 08/998,939

[22] Filed: Dec. 29, 1997

[51] Int. Cl.$^7$ .................................................. G01D 5/34
[52] U.S. Cl. .......................... 250/231.13; 250/231.17; 341/6; 377/17
[58] Field of Search ................... 250/231.13, 231.14, 250/231.15, 231.16, 231.17, 231.18, 230, 232, 233, 570; 341/13, 6; 377/17; 273/143 R

[56] References Cited

U.S. PATENT DOCUMENTS

| | | | |
|---|---|---|---|
| 3,930,201 | 12/1975 | Ackerman et al. | 307/106 |
| 4,233,592 | 11/1980 | Leichle | 341/6 |
| 4,421,980 | 12/1983 | Kuhne | 250/231.18 |
| 4,451,731 | 5/1984 | Leonard | 250/231.14 |
| 4,691,101 | 9/1987 | Leonard | 250/231.16 |
| 4,797,827 | 1/1989 | Cockerham | 701/101 |
| 4,920,259 | 4/1990 | Epstein | 250/231.13 |
| 5,331,154 | 7/1994 | Kondo et al. | 250/231.17 |
| 5,608,394 | 3/1997 | Hirabayashi | 341/11 |
| 5,774,074 | 6/1998 | Cooper et al. | 341/11 |

*Primary Examiner*—Edward P. Westin
*Assistant Examiner*—Thanh X. Luu
*Attorney, Agent, or Firm*—Roylance, Abrams, Berdo & Goodman, L.L.P.

[57] ABSTRACT

An apparatus and method for detecting the absolute position of a movable member, by monitoring the incremental and directional of movement of an indexed-encoder, coupled to the movable member, and comprising a single index space and a plurality of non-index spaces. The index space of the indexed-encoder member has a characteristic different than a characteristic of all of the other non-index spaces. The apparatus is capable of distinguishing the index space from any of the non-index spaces based on the characteristics of the index space and non-index spaces, and thus detecting when the index space or any of the non-index spaces is at the predetermined location. Based on the detection of the index and non-index spaces, the apparatus determines the direction of movement of the indexed-encoder, and an incremental movement in which the indexed-encoder has moved relative to the predetermined index location, to determine the absolute position of the indexed-encoder and hence, of the movable member with respect to the predetermined index location.

21 Claims, 19 Drawing Sheets

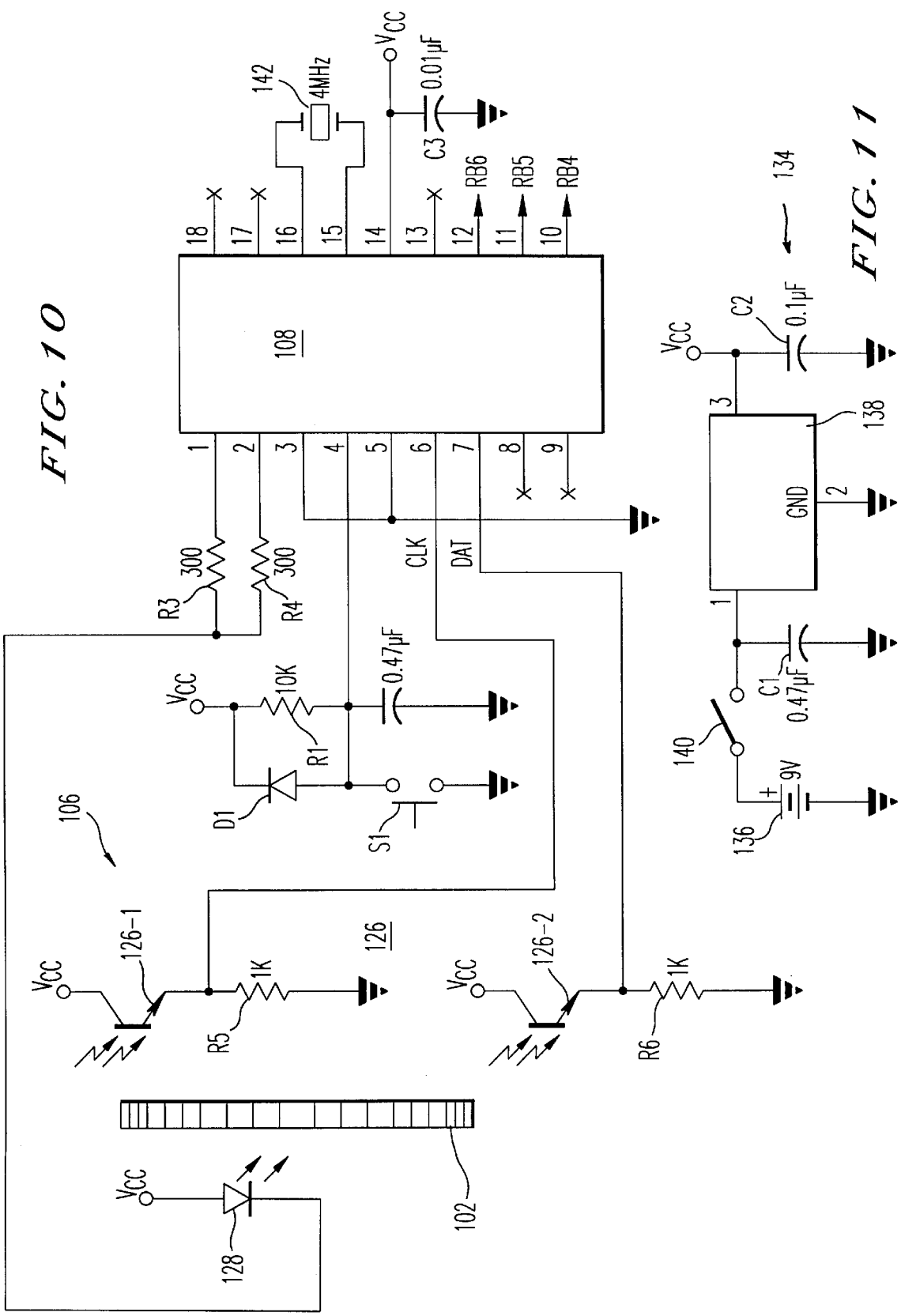

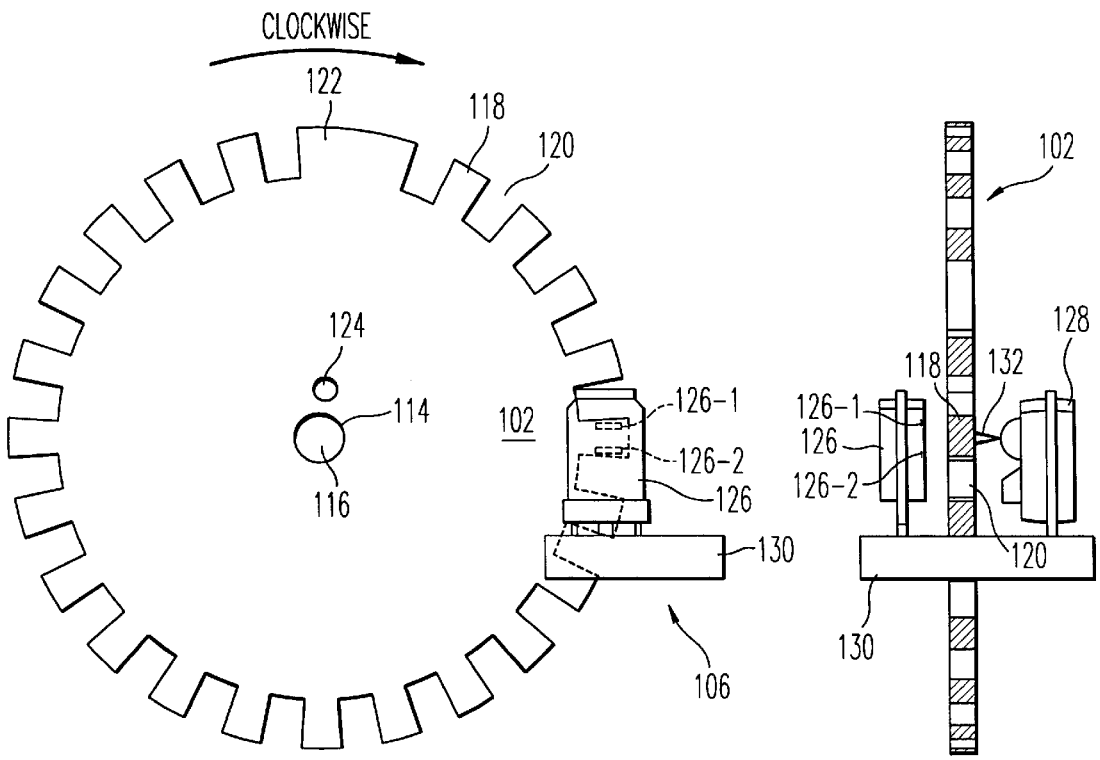
*FIG. 18A*  *FIG. 18B*
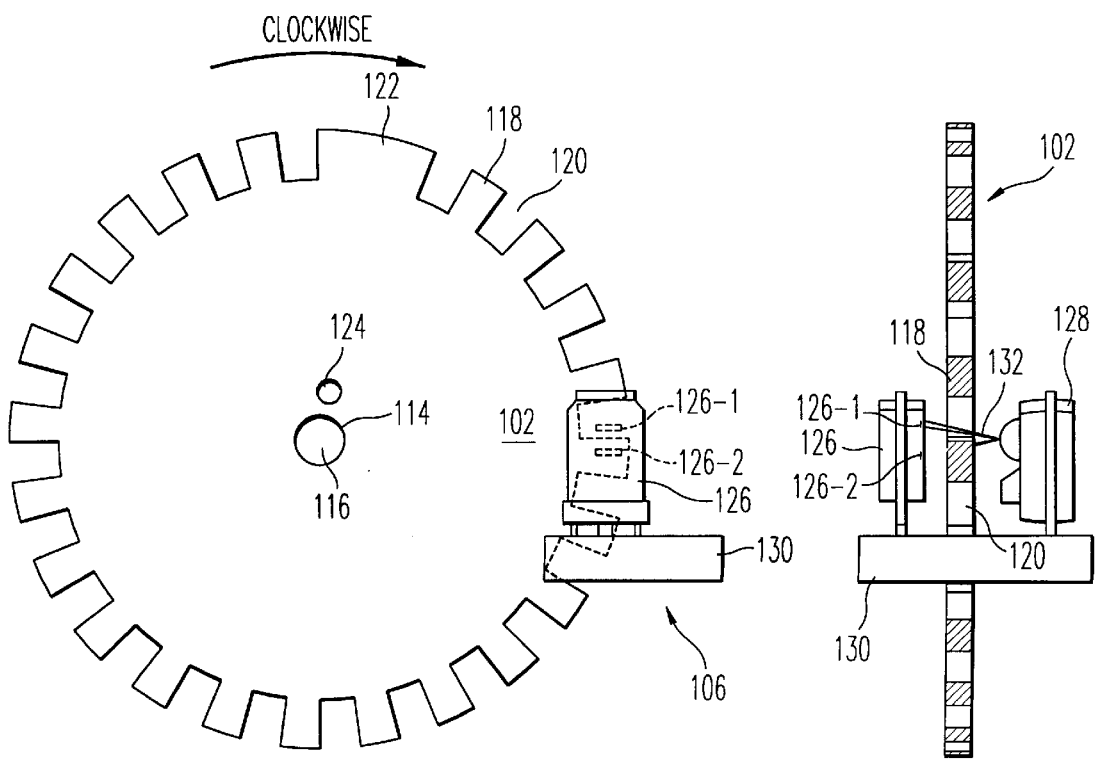
*FIG. 19A*  *FIG. 19B*

| ANGLE (°) | CLK OPTICAL PATH | COUNT | POSITION (COUNT/3) |
|---|---|---|---|
| 0-22.5 | OPAQUE | 2 | 0(INDEX) |
| 22.5-30 | TRANSPARENT | 3 | 1 |
| 30-37.5 | OPAQUE | 4 | 1 |
| 37.5-45 | TRANSPARENT | 5 | 1 |
| 45-52.5 | OPAQUE | 6 | 2 |
| 52.5-60 | TRANSPARENT | 7 | 2 |
| 60-67.5 | OPAQUE | 8 | 2 |
| 67.5-75 | TRANSPARENT | 9 | 3 |
| 75-82.5 | OPAQUE | 10 | 3 |
| 82.5-90 | TRANSPARENT | 11 | 3 |
| 90-97.5 | OPAQUE | 12 | 4 |
| 97.5-105 | TRANSPARENT | 13 | 4 |
| 105-112.5 | OPAQUE | 14 | 4 |
| 112.5-120 | TRANSPARENT | 15 | 5 |
| 120-127.5 | OPAQUE | 16 | 5 |
| 127.5-135 | TRANSPARENT | 17 | 5 |
| 135-142.5 | OPAQUE | 18 | 6 |
| 142.5-150 | TRANSPARENT | 19 | 6 |
| 150-157.5 | OPAQUE | 20 | 6 |
| 157.5-165 | TRANSPARENT | 21 | 7 |
| 165-175.7 | OPAQUE | 22 | 7 |
| 175.7-180 | TRANSPARENT | 23 | 7 |

*FIG. 27A*

| ANGLE (°) | CLK OPTICAL PATH | COUNT | POSITION (COUNT/3) |
|---|---|---|---|
| 180-187.5 | OPAQUE | 24 | 8 |
| 187.5-195 | TRANSPARENT | 25 | 8 |
| 195-202.5 | OPAQUE | 26 | 8 |
| 202.5-210 | TRANSPARENT | 27 | 9 |
| 210-217.5 | OPAQUE | 28 | 9 |
| 217.5-225 | TRANSPARENT | 29 | 9 |
| 225-232.5 | OPAQUE | 30 | 10 |
| 232.5-240 | TRANSPARENT | 31 | 10 |
| 240-247.5 | OPAQUE | 32 | 10 |
| 247.5-255 | TRANSPARENT | 33 | 11 |
| 255-262.5 | OPAQUE | 34 | 11 |
| 262.5-270 | TRANSPARENT | 35 | 11 |
| 270-277.5 | OPAQUE | 36 | 12 |
| 277.5-285 | TRANSPARENT | 37 | 12 |
| 285-292.5 | OPAQUE | 38 | 12 |
| 292.5-300 | TRANSPARENT | 39 | 13 |
| 300-307.5 | OPAQUE | 40 | 13 |
| 307.5-315 | TRANSPARENT | 41 | 13 |
| 315-322.5 | OPAQUE | 42 | 14 |
| 322.5-330 | TRANSPARENT | 43 | 14 |
| 330-337.5 | OPAQUE | 44 | 14 |
| 337.5-345 | TRANSPARENT | 45 | 15 |
| 345-352.5 | OPAQUE | 46 | 15 |
| 352.5-360 | TRANSPARENT | 47 | 15 |

*FIG. 27B*

APPARATUS AND METHOD USING AN INDEXED-ENCODER TO SENSE THE ABSOLUTE POSITION OF AN OBJECT WITH A SINGLE SET OF OPTICS

BACKGROUND OF THE INVENTION

1. Field of the Invention

The present invention relates to an apparatus and method for sensing the absolute position of an object by monitoring the magnitude and direction of movement of the object in relation to a known location. More specifically, the apparatus and method uses an indexed-encoder, such as an indexed-encoder wheel, indexed-encoder bar, indexed-encoder film, or the like, having a plurality of alternating opaque and transparent spaces and a single index opaque space, and a sensor device, which is capable of distinguishing the single index opaque space from any of the other spaces and counting the spaces after detection of the single index opaque space to determine the direction and incremental positional movement of the indexed-encoder, and thus determine the absolute position of an object which the indexed-encoder is used to monitor.

2. Description of the Related Art

Many devices currently exist which are capable of detecting the relative position of a moving object, such as a rotating shaft or encoder. For example, as described in U.S. Pat. No. 4,704,523 to Uchida, a rotary encoder device is used to detect the relative rotational position of a rotating shaft of a numerically controlled industrial machine. A rotating plate is mounted to an end of the rotating shaft, and includes a series of light shielding portions and light transmission portions that are disposed continuously along its circumference.

A pair of optical fibers are arranged to transmit light toward the rotating plate, and a plurality of corresponding optical fibers are arranged on the other side of the rotating plate to receive the light. As the rotating plate rotates, the light transmission portions allow light to pass from the transmitting optical fibers to the receiving optical fibers, while the light shielding portions prevent transmission.

Because the light emitting fibers and corresponding light receiving fibers are offset from each other, the order in which the light receiving optical fibers receive light from their respective light emitting optical fibers indicates the direction of rotation of the plate. Also, each period of light detection/non-detection indicates that a light transmission portion and light shielding portion has passed between a light emitting fiber and corresponding light detecting fiber. Accordingly, the relationship between the order in which the light is received by the optical fibers and the number of detection/non-detection conditions can be processed to determine the direction in which the plate has rotated, as well as the angular distance of rotation from a period beginning when the apparatus began to count the detection/non-detection conditions.

However, it is noted that all of the light transmission portions and light shielding portions of the rotating plate are of the same size. Therefore, it is impossible to detect the absolute rotational position of the rotating plate, because no point on the rotating plate acts as a reference position. Rather, the Uchida apparatus is only capable of detecting the relative position of the rotating plate or, in other words, the rotational distance that the rotating plate has rotated from a time when the apparatus began to count the detection/non-detection conditions.

Other relative rotational position sensor apparatuses are described in U.S. Pat. No. 2,685,082 to Beman and U.S. Pat. No. 4,496,926 to Kramer. Each apparatus includes a disc that is mounted to a rotating shaft. The disc includes uniformly sized openings and projections or light shielding areas. However, neither disk includes a reference portion. Hence, like the Uchida apparatus, these apparatuses also are incapable of determining the absolute rotational position of their respective rotating discs.

Other types of rotational position sensor apparatuses are described in U.S. Pat. Nos. 4,911,449 and 5,058,893 to Dickinson et al. Each of the Dickinson apparatuses employ a coding ring having a special pattern of slots that indicates a home or synch position of the coding ring. Furthermore, each coding ring includes a repeating pattern of narrow and wide openings about its circumference.

As the coding ring rotates, the special pattern and repeating pattern passes through an optical sensing device. The pattern of on and off conditions of the detection signal output by the optical sensing device is analyzed to determine the position of the ring and also its direction of rotation. That is, if the long "on" conditions precede the short "on" conditions of the detection signal, this indicates that the ring is rotating in one direction (e.g., clockwise). However, if the short "on" conditions precede the long "on" conditions, this indicates that the ring is rotating in the opposite direction. Furthermore, the number of combined long and short "on" conditions can be counted to determine how many positions the ring has rotated after the home or synch position has been detected.

Unlike the apparatuses described in the Uchida, Beman and Kramer patents, the Dickinson apparatus does not use offset light detectors, but rather, relies on a more complicated pattern of openings (i.e., the narrow and wide openings) to determine direction of rotation of the ring. This more complicated pattern makes the ring more difficult to manufacture, and thus, more expensive than a ring having a uniform pattern of light transmitting portions and light shielding portions. Also, because the ring must include a narrow opening and a wider opening for each position, as opposed to one opening for each position as in the Uchida, Beman and Kramer apparatuses, it is more difficult to increase the resolution of the ring in the Dickinson apparatus, because more space along the circumference of the ring must be occupied for each position to accommodate the wide and narrow openings.

Accordingly, a continuing need exists for an inexpensive, easy to manufacture apparatus that uses an encoder device to detect the actual absolute position of an object by monitoring the direction and magnitude of movement of the encoder device.

SUMMARY OF THE INVENTION

An object of the present invention is to provide an apparatus and method for accurately detecting the absolute position of an object by using an indexed-encoder device to monitor the direction and magnitude of movement of the object.

A further object of the invention is to provide an apparatus and method that is capable of monitoring the magnitude and direction of movement of an indexed-encoder device which includes a plurality of positions and a single index position, to determine the absolute position of an object which the indexed-encoder is used to monitor.

A further object of the invention is to provide an apparatus and method for monitoring the magnitude and direction of movement of an indexed-encoder by using an optical detection system that is capable of detecting the incremental position movements and direction of movements of the indexed-encoder without the need for a special pattern on the indexed-encoder.

In order to substantially achieve these objects, the present invention provides an apparatus detecting the actual position of a movable member, such as an indexed-encoder comprising a single index opaque space and a plurality of alternating non-index opaque and transparent spaces, by monitoring the incremental position movements and direction of movement of the movable member. The single index opaque space of the movable member has a length taken along the direction of movement of the movable member which is different than (e.g., greater than) the length of any of the other non-index opaque or transparent spaces as taken along that same direction.

The apparatus further includes a device which distinguishes the single index opaque space from any of the other non-index opaque or transparent spaces, and detects when the single index opaque space passes a predetermined location and when any of the other non-index opaque or transparent spaces pass the predetermined location. Specifically, the device includes a light emitting device and a light detecting device which are disposed on opposite sides of the movable member. The light emitting device emits light towards the light detecting device, and that light is obstructed by the single index opaque space and the other opaque or transparent non-index spaces on the movable member when the movable member moves.

The light detecting device includes two detectors which are disposed at a distance from each other in the direction of movement of the movable member so that they are "in electrical quadrature" with each other. Each detector outputs a signal indicating detection/non-detection of the light emitted from the light emitting device. Because the detectors are arranged in electrical quadrature, their output signals are out of phase with each other. Based on the relationship of these signals, the apparatus determines the direction of movement of the movable member, and detects the single index opaque space. Furthermore, by counting the number of occurrences of detection/non-detection after detection of the single index opaque space, the apparatus determines the incremental position movements of the movable member.

The apparatus described above is suitable for use in a variety of applications, and is particularly suitable for use in low cost games. For example, the apparatus can be used in slot machine, roulette, or wheel games to monitor the actual position of the slot machine wheels, roulette wheel or wheel games. The apparatus can also be used in a driving game to monitor the actual position of a steering wheel, or an aircraft pilot game in which it can monitor the actual throttle position of the aircraft. Furthermore, the apparatus can be used in a fishing reel game to monitor the rotation of the fishing reel to thus monitor the reeling-in/reeling-out of the fishing line.

Also, the apparatus can be used to monitor the position of a scrolling reel that scrolls a film on which is printed background images for a video game. The movement of the scrolling reel and hence the film simulates movement of the background image with respect to a user-controller image displayed on a transparent display screen. The apparatus makes it possible to determine the absolute position of the film with respect to the images appearing on the display screen. Additionally, the apparatus can be used in a pitch and/or roll absolute attitude detection application.

These and other objects and advantages of the invention will become more apparent and more readily appreciated from the following detailed description of the presently preferred exemplary embodiments of the invention taken in conjunction with the accompanying drawings.

BRIEF DESCRIPTION OF THE DRAWINGS

Referring now to the attached drawings which form part of the original disclosure:

FIG. 10 is a schematic illustrating an example of circuitry relating to the optical system and microcontroller system of the position sensor system shown in FIG. 1;

FIG. 11 is a schematic illustrating an example of circuitry of a power supply according to an embodiment of the present invention, which can provide power to the optical system, microcontroller system and display system of the position sensor system shown in FIG. 1;

FIGS. 18A and 18B are exemplary front and side elevational views, respectively, of the indexed-encoder and optical system of the position sensor system shown in FIG. 1 when the light emitted by the optical emitter is blocked from being detected by both detectors of the quadrature detector device of the optical system;

FIGS. 19A and 19B are exemplary front and side elevational views, respectively, of the indexed-encoder illustrating a condition when the light emitted by the optical detector is being detected by the CLK signal detector of the quadrature detector device of the optical system and is blocked from being detected by the DAT signal detector;

FIGS. 27A and 27B are tables setting forth an example of the relationship between the angular distance of movement of the indexed-encoder with respect to the count value positions shown in FIG. 21, the count of the counter, and the position calculated during the processing shown in FIG. 25 for a 16 position wheel;

DETAILED DESCRIPTION OF THE PREFERRED EMBODIMENTS

Figure 1:
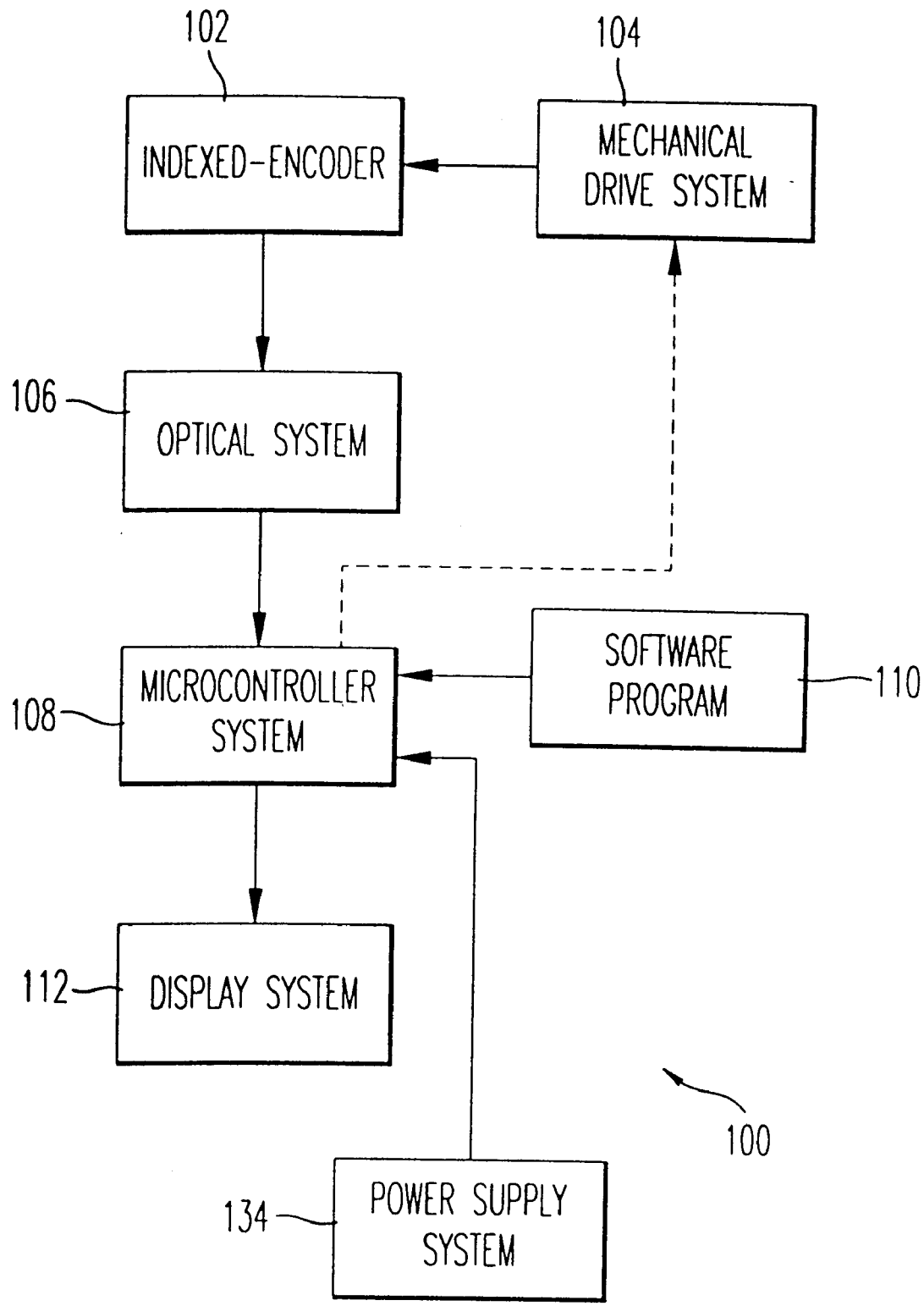
FIG. 1 is a block diagram of an example of a position sensor system according to an embodiment of the present invention.

FIG. 1 is a block diagram illustrating an example of a position sensor system 100 according to an embodiment of the present invention. Specifically, the position sensor system 100 includes an indexed-encoder 102, a mechanical drive system 104, an optical system 106, a microcontroller system 108 whose operation is controlled by a software program 110, a display system 112, and a power supply system 134 which is controlled by the microcontroller system 108 and program 110 to generate a display representing the absolute position of the indexed-encoder 106. The indexed-encoder 102 and optical system 106 are shown in more detail in FIGS. 2–5.

The indexed-encoder 102 includes a mounting hole 114 which can receive a shaft 116, such as a rivet, pin, nail, or any suitable shaft. The shaft 116 and hence, the indexed-encoder 102 can be configured to freely rotate.

Alternatively, the shaft 116 can be driven by the mechanical drive system 104 (FIG. 1) which can include any suitable type of mechanical driving apparatus, such as a motor, spring, elastic member, rubber band, gear mechanism, human induced movement and so on. The mechanical drive system 104 can be an indirect type drive system which uses a gear, capstan, or the like, to couple the driving apparatus to the shaft 116, or a direct type drive system which allows a 1:1 relationship between the rotation of the driving apparatus and the rotation of the shaft 116 and hence, the rotation of the indexed-encoder 102. Also, as indicated, the microcontroller system 108 alternately can be configured to control the mechanical drive system 104.

The indexed-encoder 102 can have any size or shape practical to the application in which the system 100 is to be used. For example, as shown in FIGS. 2–5, the indexed-encoder 102 can be a disk-shaped device anywhere from several millimeters in diameter to several centimeters, inches or feet in diameter. The indexed-encoder 102, and any variation 1102, 2102, 3102 and 4102, as shown in FIGS. 6–9 which are discussed in more detail below, are made of a material, such as a synthetic plastic, film or the like, which are able to be fabricated with opaque and transparent portions.

As shown in FIGS. 2–5, the indexed-encoder 102 further includes a series of opaque spaces 118 that are spaced about the circumference of the indexed-encoder 102 at equal or substantially equal intervals by transparent spaces 120. The size of the opaque spaces 118 and transparent spaces 120 determine the angle of resolution of the indexed-encoder 102 as will be described in more detail below. As will be appreciated from the description below, in the indexed-encoder 102 and any of the variations shown in FIGS. 6–9, the transparent spaces 120 need not be actual physical openings in the indexed-encoder 102, but can be sections of the indexed-encoder 102 which are transparent or substantially transparent to light. Also, the pattern of the opaque spaces 118 and transparent spaces 120 can instead be printed on a film (i.e., opaque parts of the film are "opaque spaces", and clear parts of the film are "transparent spaces") formed into an indexed-encoder or, that is attached to the indexed-encoder 102.

The indexed-encoder 102 further includes a single index opaque space 122 and a locating hole 124 which is aligned with or substantially aligned with the single index opaque space 122 as shown. As will be described in more detail below, the length of the single index opaque space 122 taken in the circumferential direction of the indexed-encoder 102 is three or approximately three times as long as the length of any of the opaque spaces 118 taken in that direction. However, the length of the single index opaque space 122 need not be three times the length of the other opaque spaces 118, but rather can be any suitable length, as long as that length is different from the length of the opaque spaces 118 that is consistent with the software algorithms ability to differentiate an index opaque space from a non-index opaque space. The index opaque space 122 is separated from its adjacent opaque spaces 118 by transparent spaces 120-1 and 120-2, which are identical or essentially identical in size and shape to any other transparent space 120.

In this example, the indexed-encoder 102 includes 22 opaque spaces 118 that are equally or substantially equally spaced by transparent spaces 120 such that each opaque space 118 occupies 7.5° or about 7.5° of the circumference of the indexed-encoder 102, and each transparent space 120 occupies 7.5° or about 7.5° of the circumference. The index opaque space 122 occupies 22.5° or about 22.5° of the circumference of the indexed-encoder 102. Hence, the indexed-encoder 102 includes a single index opaque space 122, 22 opaque spaces 118, and 23 transparent spaces 120. During operation of the position sensor system 100, the indexed-encoder 102 provides 7.5° or about 7.5° resolution, as will be discussed in detail below. Naturally, the size and number of opaque spaces 118 and transparent spaces 120 can be increased or decreased, as desired, to increase or decrease the resolution of the indexed-encoder 102. In this event, the length of the single index opaque space 122 can be increased or decreased proportionally. Also, instead of the index position being an index opaque space 122 as shown, it can instead be an index transparent space having a length different (e.g., 3 times as long) as any of the other transparent spaces 120.

Figure 6:
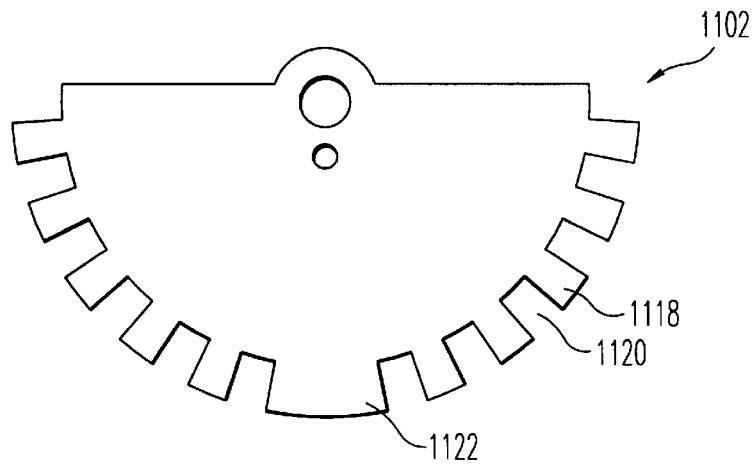
FIG. 6 is a front elevational view of another example of an indexed-encoder that can be employed in the system shown in FIG. 1.

Furthermore, as shown in FIG. 6, the indexed-encoder can be a semi-circularly shaped indexed-encoder 1102 having opaque spaces 1118, transparent spaces 1120, and an index opaque space 1122 similar to opaque spaces 118, transparent spaces 120 and index opaque space 122, respectively, of indexed-encoder 102. The indexed-encoder can also be a ¼ circle wheel, a ⅛ circle wheel, or any fraction of a circle.

Figure 7:
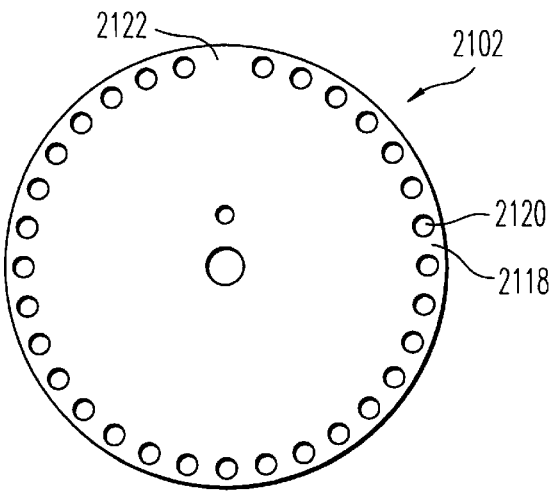
FIG. 7 is a front elevational view of a further example of an indexed-encoder that can be employed in the system shown in FIG. 1.

Furthermore, the opaque spaces 118 and transparent spaces 120 can have any suitable shape, and need not be at the circumference of the indexed-encoder 102. Rather, as shown in FIG. 7, the "spaces" can be openings 2120 in the indexed-encoder 2102 spaced uniformly or substantially uniformly about the indexed-encoder 2102 at any radial distance from the center of the indexed-encoder 2102. In this event, the openings 2120 each have the same or substantially the same size, and are each at the same or substantially the same radial distance from the center of the indexed-encoder 2102, with the opaque spaces 2118 being the portions of the indexed-encoder 2102 that are present between adjacent openings 2120 and are at the same or substantially the same radial distance from the center of the indexed-encoder 2102 as the openings 2120.

Figure 8:
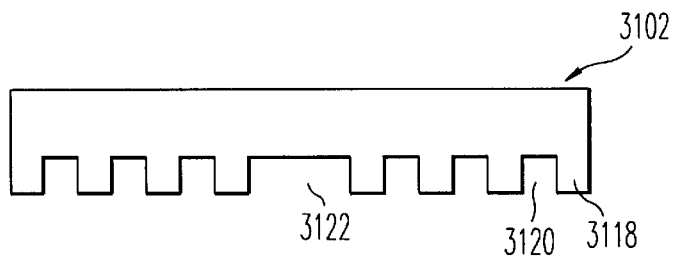
FIG. 8 is a front elevational view of still another type of indexed-encoder that can be used in the system shown in FIG. 1.
Figure 9:
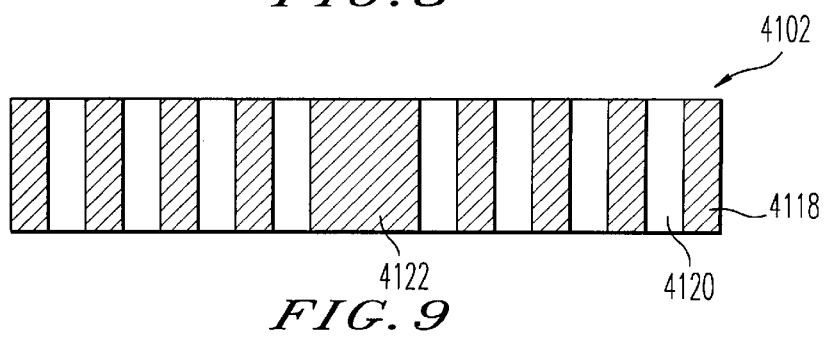
FIG. 9 is a front elevational view of a film having a plurality of opaque spaces, a plurality of transparent spaces, and a single index opaque space, which can be used as an indexed-encoder in the system shown in FIG. 1.

Also, the indexed-encoder need not be perfectly disc-shaped, but can be hexagonal, octagonal, or any other suitable shape, such as rectangular, to indicate linear movement. That is, as shown in FIG. 8, the indexed-encoder 3102 is rectangular in shape and includes opaque spaces 3118 and transparent spaces 3120 on one side thereof. It is noted that the index position 3122 in this configuration is not an opaque space having a longer length than the other teeth 3118, but rather, a transparent space having a length larger than the length of any of the transparent spaces 3120. As shown in FIG. 9, the indexed-encoder can be a film 4102 having opaque spaces 4118, transparent spaces 4120 and an index opaque space 4122. These alternate types of indexed-encoders can be shaped in any of the variations of the indexed-encoder shown in FIGS. 6 and 7.

Returning to FIGS. 2–5, the optical system 106 includes a dual-phase optical detector device 126, an optical emitter 128 and a printed circuit board 130. As illustrated, the optical detector device 126 having optical detectors 126-1 and 126-2 and optical emitter 128 are mounted on the printed circuit board 130 on opposite sides of the indexed-encoder 102. The printed circuit board 130 is fixed directly or indirectly to a mounting (not shown), so that the printed circuit board 130 and, more importantly, the optical system 106 maintains a fixed or substantially fixed relationship with the mounting, and the indexed-encoder 102 rotates with respect to the mounting, and thus, with respect to the optical system 106.

As stated above, the indexed-encoder 102, and all of the example variations of the indexed-encoder shown in FIGS. 6–9, are made of a material, such as synthetic plastic or the like, which is opaque or substantially opaque to light 132 emitted by emitter 128. Therefore, the light 132 emitted by optical emitter 128 is projected toward the indexed-encoder 102 such that as the indexed-encoder 102 rotates relative to the optical system 106, the light either passes through transparent spaces 120 and is received by detector device 126, or is blocked by opaque spaces 118.

The detector device 126 and emitter device 128 can be positioned at any suitable location with respect to the indexed-encoder, as long as the index opaque space 122 (or transparent space 3122 as in FIG. 8), opaque spaces 118 and transparent spaces 120 can pass between the detector device 126 and the emitter device 128 when the indexed-encoder 102 moves. For example, if the indexed-encoder is a semi-circularly shaped wheel 1102 as shown in FIG. 6, or a rectangularly shaped encoder 3102 as shown in FIGS. 8 and 9, the detector 126 and emitter 128 are positioned so that as the indexed-encoder moves with respect to the optical system 106, the teeth and spaces pass between the emitter 128 and detector 126.

FIG. 10 is a schematic illustrating an example of the circuitry of the optical system 106 and microcontroller system 108 of the position sensor system 100 shown in FIG. 1. The microcontroller system 108 can include any type of microcontroller or microprocessor known in the art, such as a Microchip PIC 16C58A running at 4.0 MHz. As a practical matter, the microprocessor should run at least 32 kHz.

As illustrated, terminal 14 of the microcontroller system 108 (hereinafter "microcontroller 108") is coupled to receive a voltage Vcc from a power supply, and terminals 3 and 5 are coupled to ground. An example of a power supply system 134 which provides the voltage Vcc is shown in FIG. 11.

As illustrated, the power supply 134 includes a battery 136, such as a standard 9-volt DC battery, a regulator IC 138, which regulates the 9-volt DC voltage to a standard Vcc voltage of at or about 5 volts, and an on-off switch 140 which couples the battery 136 to the input terminal 1 of regulator IC 138 when closed. The power supply system 134 also includes a capacitor C1 which is, for example, a 0.47 µF capacitor, that is coupled between the input terminal 1 of the regulator 138 and ground, and a capacitor C2 which is, for example, a 0.1 µF capacitor that is coupled between the output terminal 2 of the regulator 138 and ground. The capacitors C1 and C2 can have any practical capacitance value.

Returning to FIG. 10, as indicated, terminal 14 of the microcontroller 108 is further coupled to ground via bypass capacitor C3, which is, for example, a 0.01 µF capacitor, but can have any practical capacitance value. In this example, a crystal 142 operating at 4 MHz is coupled across terminals 15 and 16 of the microcontroller 108 and thus functions as the frequency determining component of the microcontroller's 108 internal clock. As stated above, the microcontroller 108 can operate at any practical frequency, which can be chosen depending upon the anticipated speed of movement of the indexed-encoder 102.

As further illustrated, terminal 4 of microcontroller 108 is coupled to a diode D1 and a resistor R1 which is, for example, a 10 kΩ resistor (but can have any practical value). Resistor R1 and diode D1 are coupled in parallel to each other to a terminal at which the voltage Vcc is applied. As further indicated, a bypass capacitor C6, which has a capacitance of 0.47 µF (but can have any practical value), is coupled to terminal 4 of microcontroller 108. Also, a reset button S1, which can be used to reset the system 100, is coupled to terminal 4 of the microcontroller 108 as indicated.

Terminals 1 and 2 of microcontroller 108 are coupled via current limiting resistors R3 and R4, respectively, (e.g., which are 300Ω resistors but can have any practical value) to the cathode of the optical emitter 128, and the anode of optical emitter 128 is coupled to the power supply voltage Vcc. The optical emitter 128 can be any type of light emitting device, such as Sharp Corporation model GL480 infra-red light emitting diode, or the like.

As further illustrated, the dual-phase optical detector 126 includes optical detectors 126-1 and 126-2. In this embodiment, the optical detectors 126-1 and 126-2 are photo transistor-type detectors integrated into a single package 126, such as those employed in Sharp Corporation model PT4120J, each having a base which functions as an infra-red photodetector that detects the infra-red light emitted from the optical emitter 128. The light emissions of the system need not be in the infra-red portion of the spectrum, but could rather be in the visible portion of the spectrum or any portion of the spectrum that is appropriate. The collector of each optical detector 126-1 and 126-2 is coupled to the power supply voltage Vcc. The emitter of optical detector 126-1 is coupled to input terminal 6 of microcontroller 108, and the emitter of optical detector 126-2 is coupled to input terminal 7 of microcontroller 108. The emitters of optical detectors 126-1 and 126-2 are also coupled to ground via load resistors R5 and R6, respectively (e.g., which are 1 kΩ resistors but can have any practical value).

As described in detail below, the microcontroller 108 controls the emitter 128 with rapid pulses of infra-red light which are detected by detectors 126-1 and 126-2 as the indexed-encoder 102 moves with respect to the detector device 126. The detectors 126-1 and 126-2 are positioned at a distance from each other in the circumferential or substantially the circumferential direction of indexed encoder 102, such that they are "in electrical quadrature" with each other, and thus, their output signals CLK and DAT are out of phase by 90° or about 90°. If the indexed-encoder is a rectangular indexed-encoder as shown, for example, in FIG. 8, the detectors 126-1 and 126-2 are positioned such that they are "in electrical quadrature".

The signals CLK and DAT output by detectors 126-1 and 126-2, respectively, are received and processed by the microcontroller 108, which in turn outputs signals at, for example, terminals 10–12, to the display system 112. The display system 112 thus generates a display representative of the detected position of the encoder based on signals output by the microcontroller 108.

Figure 12:
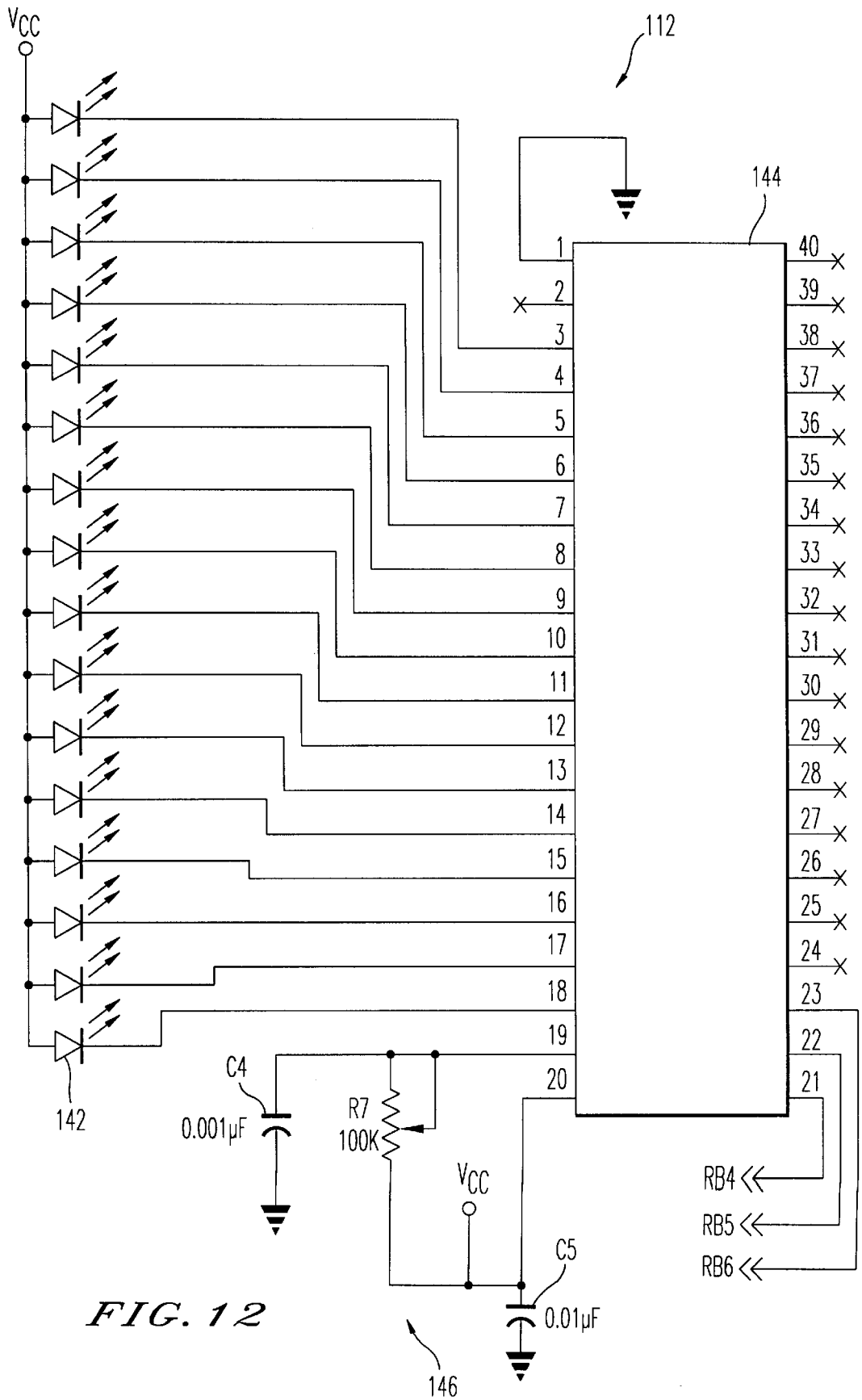
FIG. 12 is a schematic illustrating an example of the circuitry relating to the display system of the position sensor system shown in FIG. 1.

An example of the display system 112 is shown in FIG. 12. This example includes a plurality of LEDs 142 and an LED driver 144. The LED driver 144 receives the signals output by the microcontroller 108 on lines RB4, RB5, RB6 and lights the appropriates LED 142 based on the detected position of the indexed-encoder 102, as will be described in more detail below. As indicated, the LED driver 144 is powered by voltage Vcc. A brightness adjustment circuit 146, including, for example, a variable resistor R7 (e.g., which is a variable 100 kΩ resistor, but can have any practical value) and capacitor C4 (e.g., which is a 0.001 µF capacitor, but can have any practical value), can be used to adjust the brightness of the LEDs 142. The capacitor C5, which is a 0.01 µF capacitor (but can have any practical value) is a bypass capacitor for LED driver 144. As stated above, however, the display system 112 can be any type of known display device or display screen.

The operation of the system 100 as shown in FIG. 1 will now be described. For purposes of the following explanation, reference will be made to the system 100 including the indexed-encoder 102 as shown in FIGS. 2–5, for example. However, the following operation would be performed by the system 100 if modified to employ any of the variations of the indexed-encoder as shown or described with respect to FIGS. 6–9, or any other variation which would be consistent with the general description of the indexed-encoder set forth above.

Figures 13, 14:
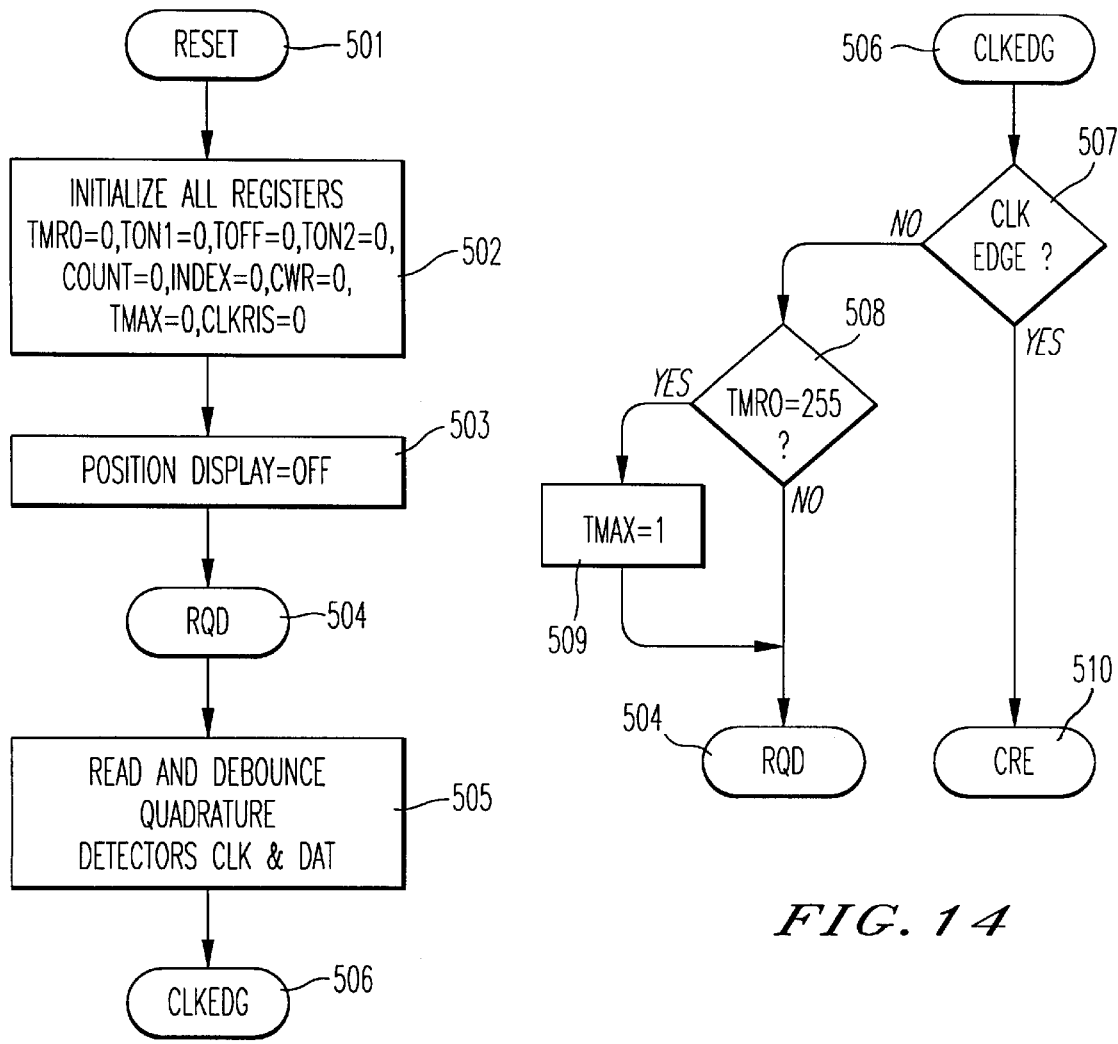
FIG. 13 is a flow diagram illustrating an example of the steps performed by the microcontroller system of the position sensor system shown in FIG. 1 during initialization of the microcontroller system and when the microcontroller system reads the signals output by the optical system.
FIG. 14 is a flow diagram illustrating an example of the steps performed by the microcontroller system of the position sensor system shown in FIG. 1 when the microcontroller is monitoring the CLK signal output by one of the detectors of the optical system to monitor movement of the indexed-encoder.

As shown in the flow chart in FIG. 13, when the apparatus 100 is in a rest state and power has been activated or a reset button (not shown) has been pressed in step 501, the registers, counters and flags used by the microcontroller 108 during the processing will be initialized to a known state in step 502. All registers, counter and flags are implemented in hardware internally in the microcontroller. These hardware registers, counters and flags are read, written and manipulated by the software program. The flags are, for example, one-bit boolean flags that are set to "1" or "0". It is noted that during the initial power-up or when the reset occurs, the index opaque space 122 of the indexed-encoder 102 can be at any position with respect to the optical system 106. In step 503, the microcontroller 108 turns off the "POSITION DISPLAY" and thus refrain from generating a display.

The processing then continues to the read quadrature detector (RQD) processing steps beginning at step 504. Specifically, in step 505, the microcontroller 108 will read the status of signals CLK and DAT which are output by detectors 126-1 and 126-2, respectively, and will represent the status of those signals as flags CLK and DAT, respectively. The microcontroller 108 will also perform a debouncing routine on the CLK and DAT signals to eliminate any aberrations that may exist in those signals. The microcontroller 108 then determines, from the status of the flags CLK and DAT, whether the indexed-encoder 102 has moved with respect to the optical system 106.

After reading the CLK and DAT signals in step 505, the processing of the microcontroller 108 proceeds to step 506 (FIG. 14), where it will continue to the "CLKEDG" routine in which the microcontroller 108 will determine if the status of the CLK signal has changed, thus indicating that the indexed-encoder 102 has moved with respect to the optical system 106.

Specifically, in step 507, the microcontroller 108 determines if the state of the CLK flag is changing from low (0) to high (1), or vice versa, indicating that either a transparent space 120 has begun to pass between emitter 128 and detector 126-1, or an opaque space 118 or index opaque space 122 has begun to pass between emitter 128 and detector 126-1 (hereinafter a "CLK edge condition"). That is, as described above, because the opaque spaces 118 and index opaque space 122 are opaque and thus block or substantially block the light 132 being emitted by emitter 128 from being detected by detector 126-1 when they are at a location between the emitter 128 and detector 126-1, the state of the flag CLK will go from high (1) to low (0) when any of opaque spaces 118 or index opaque space 122 begins to pass between the emitter 128 and detector 126-1, thus indicating movement of the indexed encoder 102. Also, the state of the flag CLK will go from low (0) to high (1) when any transparent space 120 begins to pass between the emitter 128 and detector 126-1, thus indicating movement of the indexed encoder 102.

If in step 507 the microcontroller 108 does not detect a CLK edge condition, the processing proceeds to step 508 where the microcontroller 108 determines whether the value of the register TMR0 equals its maximum value which, in this example, is decimal value 255. The register TMR0 is, for example, a hardware timer included within the microcontroller 108 that is read, written and cleared under the control of the microcontroller 108 based on the frequency at which the microcontroller 108 is operating, and counts by increments of "1" from 0 to 255. The time that elapses for each count by 1 is controlled by the microcontroller's built in prescaler which can be set to a time period that is driven by the frequency at which the microcontroller 108 is operating.

The register TMR0 is used to indicate whether the indexed-encoder 102 is moving at a speed which will enable the index opaque space 122 to be detected and distinguished from any of the other opaque spaces 118. That is, before the system 100 begins to monitor the position of the indexed-encoder 102 in a meaningful manner, the index opaque space 122 must first be detected by the microcontroller/software system 108/110. When the register TMR0 has reached its maximum value of 255 before a CLK edge condition has occurred and has been detected in step 507, this indicates that the indexed-encoder 102 is not moving, or is moving at a relatively slow speed which is too slow for the microcontroller 108 to effectively distinguish the index opaque space 122 from any of the other opaque spaces 118.

For example, if a transparent space 120 was between the emitter 128 and detector 126-1 during initial power-up or reset, a condition of "TMR0=255" means that the indexed-encoder 102 has not moved far enough so that an opaque space 118, index opaque space 122 or transparent space 120 has begun to enter the space between emitter 128 and detector 126-1 to cause the microcontroller 108 to detect a change in the state of the flag CLK in step 507 before the register TMR0 has reached its maximum value. If the indexed-encoder 102 is moving this slowly, the likelihood is high that the index opaque space 122 will not be distinguishable from the normal opaque spaces 118, or that an erroneous detection of the index opaque space 122 may occur. Accordingly, in step 509, the microcontroller will set the flag TMAX to "1", thus indicating that the index opaque space detection processing described below will not be performed while the indexed-encoder 102 is moving at this slow speed.

If the register TMR0 has reached its maximum value, after setting the flag TMAX to "1" in step 509, the processing returns to RQD step 504 where the microcontroller 108 will again read the signals CLK and DAT from detector 126-1 and 126-2, respectively, in step 505. This process will continue until the microcontroller 108 detects a CLK edge condition in step 507. When this occurs, the processing will continue to step 510 where the microcontroller 108 will determine whether the flag CLK is going from low to high or high to low, or, in other words, whether the flag CLK is going from 0 to 1 or 1 to 0, respectively.

Figure 15:
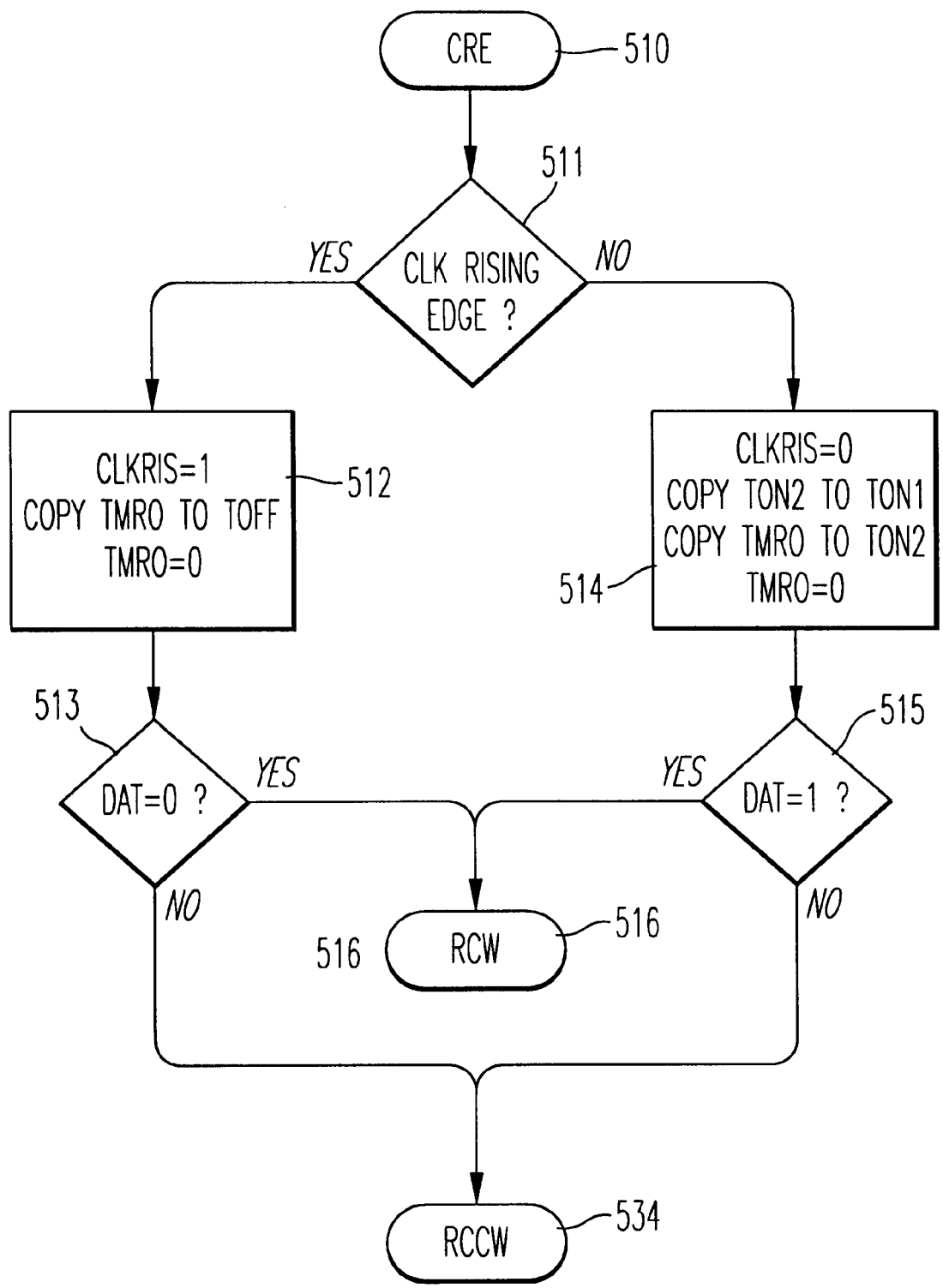
FIG. 15 is a flow diagram illustrating an example of the steps performed by the microcontroller system of the position sensor system shown in FIG. 1 when the microcontroller system is monitoring the CLK and DAT signals output by the detectors of the optical system.
Figures 16A, 16B:
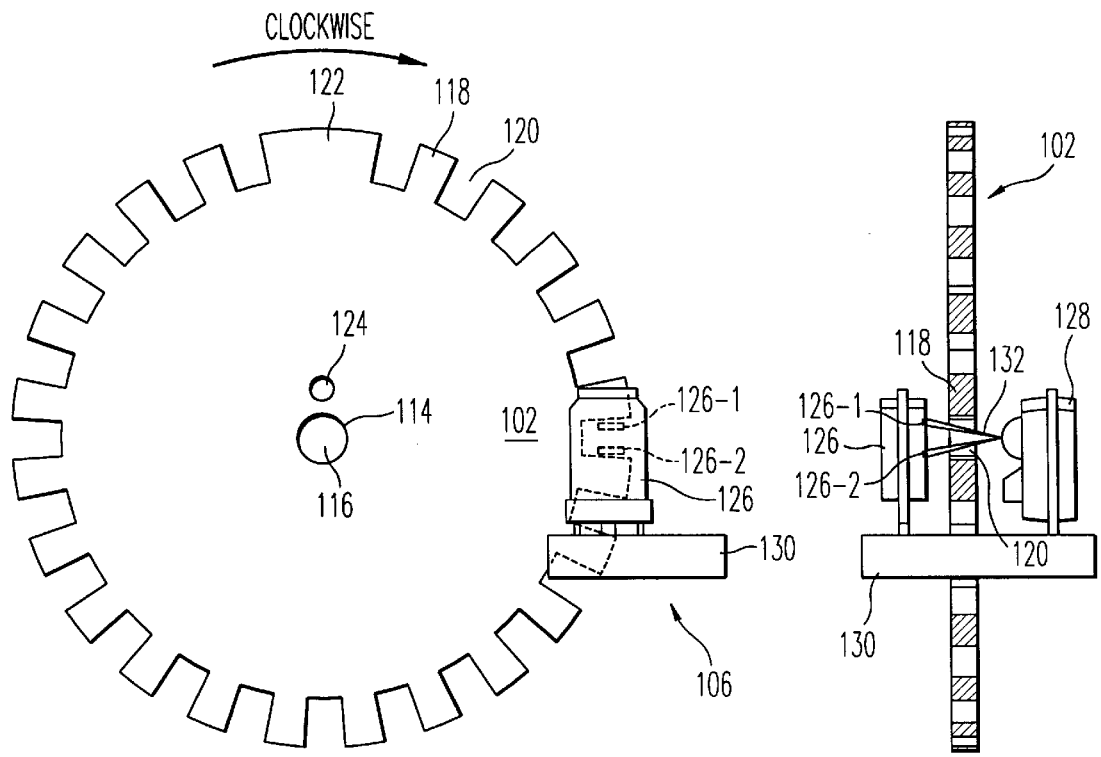
FIGS. 16A and 16B are exemplary front and side elevational views, respectively, of the indexed-encoder and optical system of the system shown in FIG. 1 illustrating a condition when the light emitted by the optical emitter is being detected by both detectors of the quadrature detector device of the optical system.

As shown in the flow chart in FIG. 15, the microcontroller 108 determines in step 511 whether the change in the level of flag CLK indicates a rising or falling edge. If the microcontroller 108 detects that flag CLK is going from low (0) to high (1) or, in other words, rising (hereinafter a "CLK rising edge"), the processing continues to step 512, and then to step 513 where the microcontroller 108 checks the state of flag DAT representative of the debounced signal DAT being provided from detector 126-2, to ascertain in which direction the indexed-encoder 102 is moving with respect to the optical system 106. If, on the other hand, the microcontroller 108 detects that flag CLK is going from high (1) to low (0) or, in other words, falling (hereinafter a "CLK falling edge"), the processing continues to step 514, and then to step 515 where the microcontroller 108 checks the state of flag DAT representative of the debounced signal DAT being provided from detector 126-2, to ascertain in which direction the indexed-encoder 102 is moving with respect to the optical system 106.

Figures 17A, 17B:
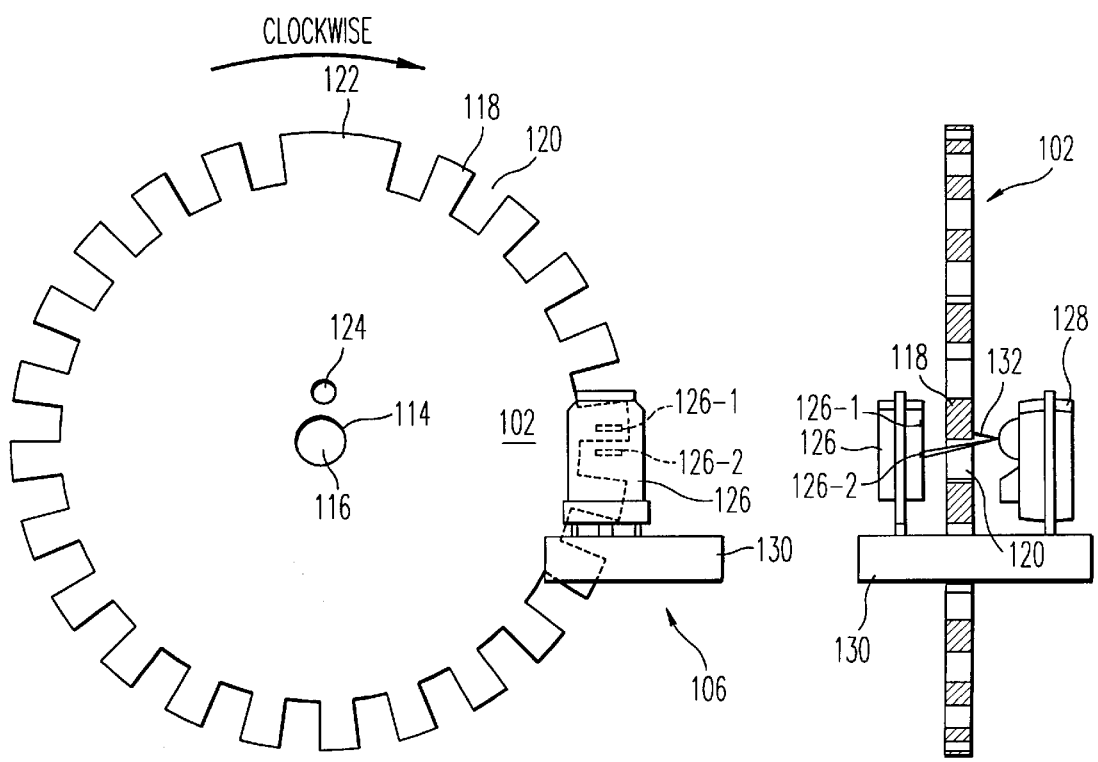
FIGS. 17A and 17B are exemplary front and side elevational views, respectively, of the indexed-encoder and optical system of the position sensor system shown in FIG. 1 when the light emitted by the optical emitter is being detected by the DAT signal detector of the quadrature detector device of the optical system and is being blocked from being detected by the CLK signal detector of the quadrature detector device.

As described above, the movement of the indexed-encoder 102 with respect to the optical system 106 results in the light signal 132 output from the emitter 128 either passing through transparent space 120 in the indexed-encoder 102 and being detected by either or both of detectors 126-1 and 126-2, or being blocked totally or in part by opaque space 118 of indexed-encoder 102 and therefore not being detected by either or both of detectors 126-1 and 126-2. For example, as shown in FIGS. 16A–19B, which represent front and side elevational views of the indexed-encoder 102 and optical system 106, when a transparent space 120 is present between emitter 128 and both detectors 126-1 and 126-2 (FIGS. 16A and 16B), both detectors 126-1 and 126-2 detect the light 132 being emitted, and the output signals CLK and DAT from the detectors 126-1 and 126-2, respectively, both are high (1). However, if the indexed-encoder 102 in FIG. 16A and 16B begins to move with respect to the optical system 106 in a clockwise direction as indicated, the condition in FIG. 17A and 17B where one of the opaque spaces 118 will begin to pass between the emitter 128 and detector 126-1. In this event, as shown in FIG. 17B, the opaque space 118 will prevent one of the detectors 126-1 from receiving the light 132. Hence, the CLK signal output by detector 126-1 will become low (0).

Once the indexed-encoder 102 rotates so that the opaque space 118 completely blocks the emitted light from being detected by both detectors 126-1 and 126-2 as shown in FIGS. 18A and 18B, the output CLK and DAT signals from detectors 126-1 and 126-2, respectively, will both be low (0). As shown in FIGS. 19A and 19B, when the indexed-encoder moves further, one of the transparent spaces 120 will begin to pass between the emitter 128 and detector device 126-1. In this event, the detector 126-1 will begin to receive light again. Hence, the CLK signal output by detector of 126-1 will become high (1).

The above-described conditions shown in FIGS. 16A–19B repeat as the indexed-encoder 102 continues to rotate in the same direction. If the indexed-encoder 102 begins to rotate in the opposite direction (i.e., the counter-clockwise direction), the conditions shown in FIGS. 16A–19B will repeat in reverse order.

Figure 20:
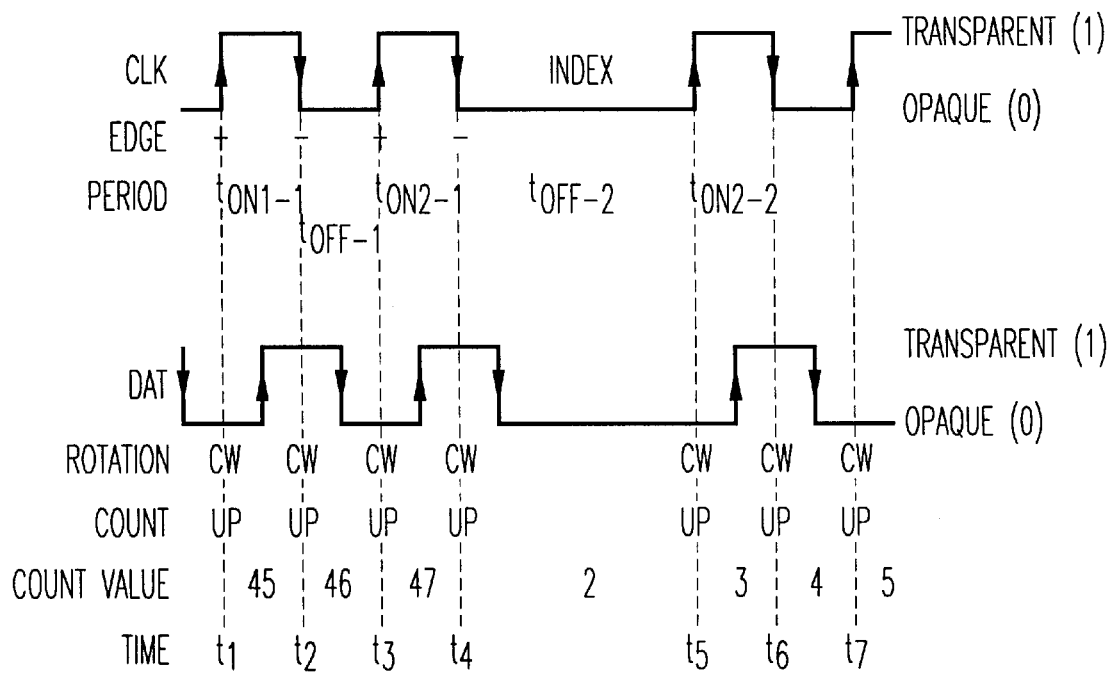
FIG. 20 is a graph illustrating the relationship between the CLK and DAT signals output by the CLK and DAT detectors of the quadrature detector device of the optical system in response to rotation of the indexed-encoder in a clockwise direction.
Figure 21:
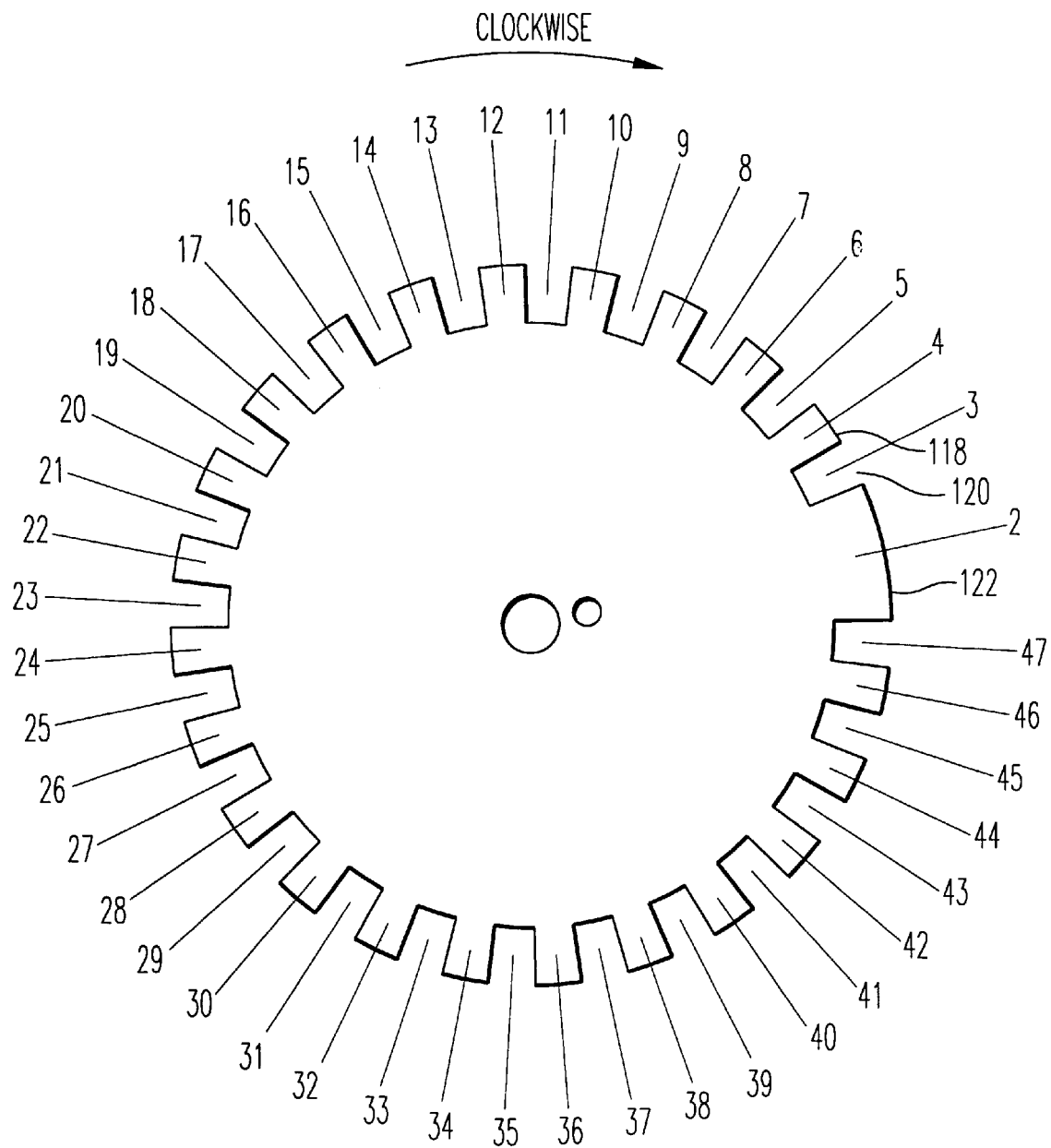
FIG. 21 is an example of the indexed-encoder of the position sensor system shown in FIG. 1 in which the single index opaque space and each of the non-index space are identified with count numbers.

FIG. 20 illustrates the relationship of the signals CLK and DAT output by detectors 126-1 and 126-2, respectively, as the indexed-encoder 102 rotates in a clockwise direction. As will be described in more detail below, FIG. 20 indicates the status of debounced signals CLK and DAT and hence, flags CLK and DAT, when the count values on the indexed-encoder 102 numbered "45", "46", "47", "2", "3", "4" and "5", as shown in FIG. 21, have passed between the emitter 128 and detector device 126. It is noted that position number "2" represents the position of the index opaque space 122. Because the index opaque space 122 is longer than the non-index opaque spaces 118, the length of time ($t_{off-2}$ in FIG. 20) that index opaque space 122 interrupts the emitted light 132 from being detected by detector 126-1 (and hence, flag CLK is low (0)) is longer than any of the other lengths of time that any of the other non-index opaque spaces 118 interrupts the emitted light 132 from being detected by the detector 126-1.

As described above, because the detectors 126-1 and 126-2 are positioned at a distance from each other on a radial arc of the indexed-encoder 102 such that they are "in electrical quadrature" with respect to each other, the respective output signals are out of phase by 90° or about 90°. This signal output phase difference occurs due to the detectors' positional differences at the radial arc of the indexed-encoder 102. Hence, as shown in FIG. 22, if the indexed-encoder 102 is rotating in the counterclockwise direction, the debounced DAT signal output by detector 126-2 leads the debounced CLK signal output by detector 126-1 (instead of the CLK signal leading the DAT signal as in the clockwise movement), because the opaque space 118 or transparent space 120 reaches the location between emitter 128 and detector 126-2 before they reach a location between emitter 128 and detector 126-1.

Figure 22:
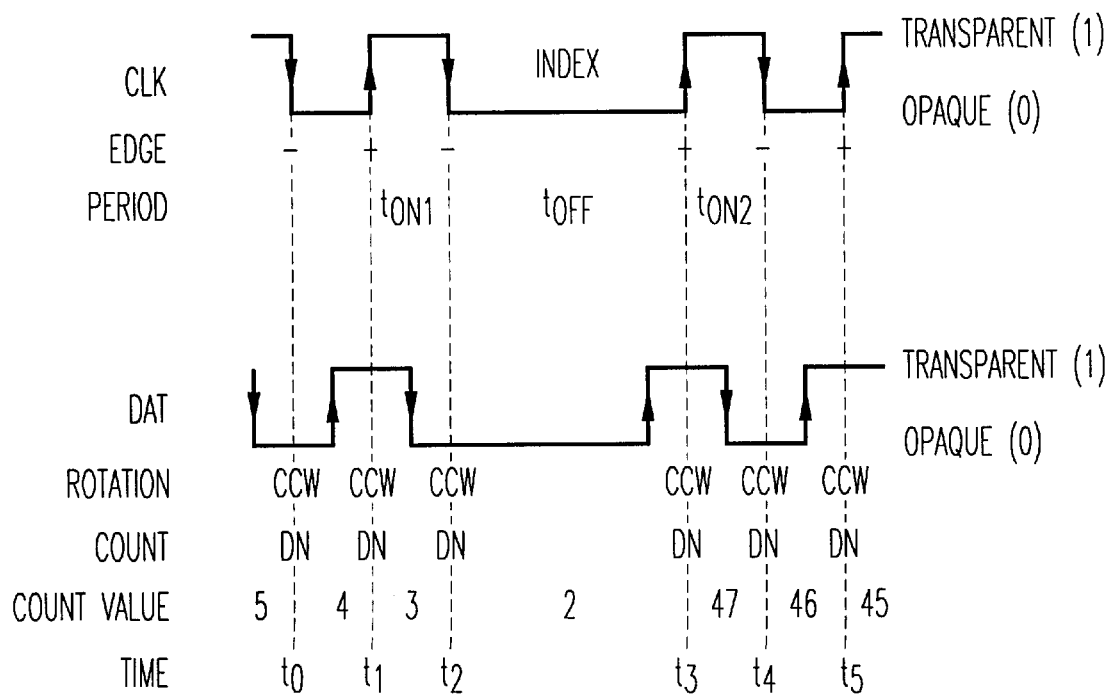
FIG. 22 is a graph illustrating the relationship between the CLK and DAT signals output by the CLK and DAT detectors of the quadrature detector device in response to rotation of the indexed-encoder in a counterclockwise direction.

It is further noted that if the indexed-encoder is a linear type indexed-encoder 3102 and 4102 as shown, for example, in FIGS. 8 and 9, the emitter 128 and detectors 126-1 and 126-2 are configured so that the relationship of the debounced signals CLK and DAT (and hence, flags CLK and DAT) also will be as shown in FIGS. 20 and 22 when the opaque spaces 3118/4118, transparent spaces 3120/4120 and index transparent space 3122 and index opaque space 4122 of the indexed-encoder 3102/4102 pass between the emitter 128 and detector device 126 during movement of the indexed-encoder 3102/4102. In this event, the direction of movement can be identified as "right" and "left" instead of "clockwise" and "counterclockwise", respectively.

To assist in explaining the operation of the system 100 and, in particular, the manner in which the microcontroller 108 uses flags CLK and DAT to detect the index opaque space 122 and count the opaque spaces 118 and transparent spaces 120, it will be assumed that when the power of the system 100 is turned on (or the system 100 is reset), the indexed-encoder 102 is positioned such that the transparent space numbered count value "45" in FIG. 21 is about to pass between the emitter 128 and detector 126-1, and the indexed-encoder 102 is moving in a clockwise direction at a speed sufficient for the microcontroller 108 to detect each CLK edge condition in step 507 before the register TMR0 reaches its maximum value. However, the microcontroller 108 is capable of detecting the index opaque space 122 regardless of the initial position of the indexed-encoder 102, and regardless of the direction in which the indexed-encoder 102 is moving.

As explained above, since it is presumed that the transparent space numbered count value "45" of the indexed-encoder 102 is the first "position" to begin passing between the emitter 128 and detector 126-1, the microcontroller 108 will detect in step 511 (FIG. 15) that the condition is a CLK rising edge. The time of the CLK rising condition is identified as $t_1$, in FIG. 20. The processing then proceeds to step 512 where, as explained above, the CLK rising flag CLKRIS is set to "1", the value of register TOFF is set to the value of the register TMR0, and the register TMR0 is reset to "0".

It is noted that when the register TMR0 is reset back to 0 in this or any other case, the register TMR0 will immediately begin counting again. However, because the processing of the microcontroller 108 as shown in the flowcharts of FIGS. 13–15, 23–26 and 28–30 occurs so quickly relative to the movement of the indexed-encoder 102, any single increase in the register TMR0 that occurs during this processing will be tested at step 508 and thus does not adversely affect the operation of the system 100. Accordingly, as will be described in more detail below, for all practical purposes, the value of the register TMR0 (assuming that it has not reached its maximum value) can be deemed the time that elapses between adjacent CLK edge conditions. In other words, the processing cycle must be less than a register TMR0 incrementing time period.

Since the CLK edge condition detected at time $t_1$ is the first CLK edge condition that has occurred after the powering up or resetting of the system 100, the value of TOFF is essentially meaningless this time.

In step 513, if the microcontroller 108 determines that flag DAT is at a low level (0), the microcontroller 108 determines that the flag DAT has a relationship as shown at time $t_1$ in FIG. 20 and thus, determines that the indexed-encoder 102 is rotating in a clockwise direction. In this event, the processing proceeds to the rotating clockwise (RCW) processing beginning at step 516. However, if the microcontroller 108 determines that the state of flag DAT is high (1), then the microcontroller 108 determines that flag DAT has the relationship shown, for example, at time $t_5$ in FIG. 22, and thus, the microcontroller 108 determines that the indexed-encoder 102 is rotating in a counter-clockwise direction. In this event, the processing proceeds to the rotating counter-clockwise (RCCW) processing beginning at step 534, which will be described in more detail below.

Because it is presumed that flag DAT is low (0) as shown at time $t_1$ in FIG. 20 (because it is presumed that the indexed-encoder 102 is rotating in a clockwise direction), the microcontroller 108 will determine that the indexed-encoder 102 is moving in a clockwise direction, and proceed to the clockwise rotation processing beginning at step 516, as will now be described with reference to the flowchart shown in FIG. 23.

After beginning the clockwise rotation processing in step 516, the processing proceeds to step 517, where the microcontroller 108 checks the state of the clockwise rotation flag (CWR) to ascertain whether it has been previously determined that the indexed-encoder 102 is rotating in a clockwise direction. If it has already been determined that the indexed-encoder 102 is rotating in a clockwise direction, the processing proceeds to step 518 where the microcontroller 108 determines whether the flag TMAX has been set to 1 (indicating that the clock TMR0 has reached the maximum value).

However, as stated above, this is the first clockwise rotation processing being performed after the first CLK edge condition after the system 100 was powered up or reset. Accordingly, the microcontroller 517 will determine in step 517 that the clockwise rotation flag (CWR) is not equal to "1", and proceed to step 520. In step 520, the state of the clockwise rotation flag (CWR) is set to 1, thus indicating clockwise rotation. The values of registers TON1, TON2 and TOFF are all reset to 0 in step 521, and the microcontroller 108 proceeds to the clockwise count (CWC) routine beginning at step 530 in the flowchart shown in FIG. 24.

At this time, the values of the registers TON1, TON2 and TOFF, which are used to detect the index opaque space 122 as described below, are as follows:

TON1=0
TOFF=0
TON2=0

The microcontroller 108 then proceeds from step 530 to step 531 where it determines whether the value of the position count register COUNT is equal to 47, which is the maximum count value on the indexed-encoder 102 as shown in FIG. 21, where each opaque space 118 occupies 7.5° of the circumference, each transparent space 120 occupies 7.5° of the circumference, and index opaque space 122 occupies 22.5° of the circumference. As indicated, if the value of register COUNT is equal to the maximum 47, the value of register COUNT is reset to 2 in step 532.

Figure 25:
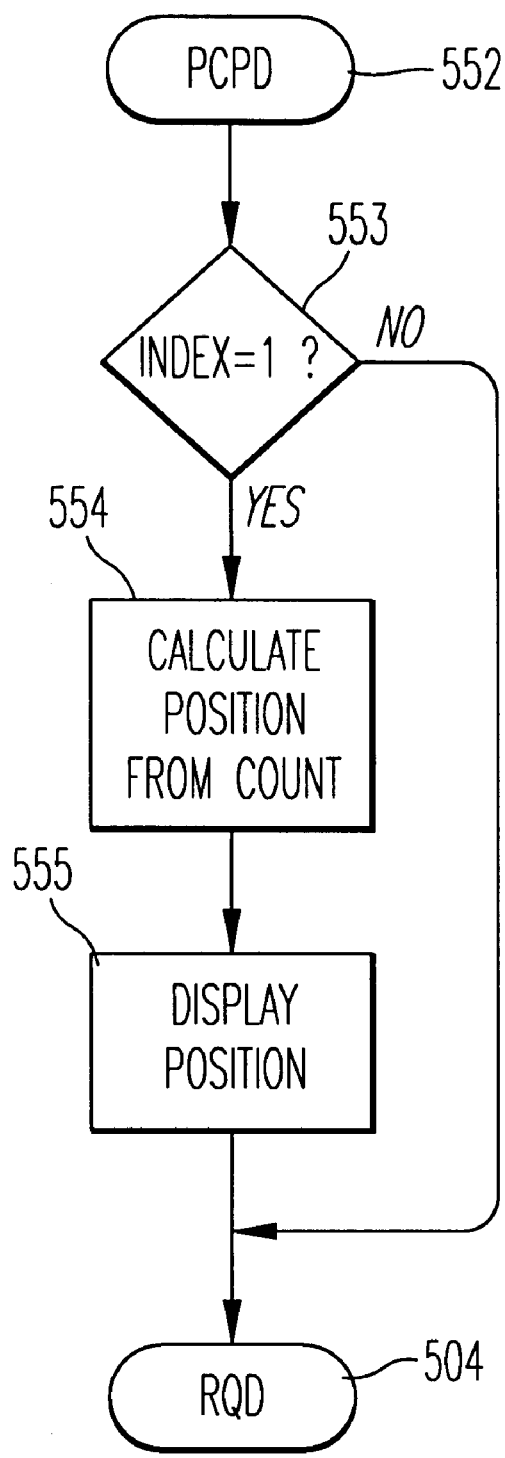
FIG. 25 is a flow diagram illustrating an example of the process count/position display (PCPD) steps performed by the microcontroller system when the microcontroller system is calculating the position of the object being monitored by the indexed-encoder based on the value of the counter, and controlling displaying of the calculated position.

However, because this is the first time through the routine, the value of the count register is "0". Hence, in step 531, the microcontroller 108 determines that the value of register COUNT is not equal to its maximum (i.e., 47), and the processing continues to step 533 where the value of register COUNT is increased by 1. The processing will then proceed to the process count position display (PCPD) beginning at step 552 as shown in FIG. 25.

The microcontroller 108 will proceed from step 552 to determine in step 553 whether the index opaque space 122 has been located by checking the state of the flag INDEX. If the state of the flag INDEX is not equal to 1, the processing will return to the read quadrature detectors (RQD) processing beginning at step 504 in FIG. 13, where signals CLK and DAT will be read and debounced in step 505 and the processing will repeat. It is noted that the display processing in steps 554 and 555 are skipped when the index opaque space 122 has not been detected, because the value of register COUNT from which the position display information is ascertained is essentially meaningless until the index opaque space 122 has been detected. Accordingly, no displaying will occur. However, as will be explained in more detail below, once the index opaque space 122 is detected and the state of flag INDEX has been set to 1, then the display processing shown in steps 554 and 555 are performed.

Because this is the first time through the processing after powering up or resetting the system 100, the index opaque space 122 has not been detected, and the state of flag INDEX is not equal to 1. Hence, the processing returns to step 504.

As stated above, for explanatory purposes, it will be assumed that the indexed-encoder 102 continues to rotate in the clockwise direction. Accordingly, as the processing repeats beginning at step 504 and proceeds as shown in the flow charts of FIGS. 13 and 14, when the CLK edge condition has been detected in step 507, the processing will proceed to step 510 in FIG. 15.

It is presumed that the detected clock edge condition occurred at time $t_2$ as shown in FIG. 20. This means that the opaque space 118 numbered count value "46" (FIG. 21) is beginning to pass between the emitter 128 and detector 126-1 and thus, begins blocking the light 132 from being detected by detector 126-1 as shown in FIG. 17A and 17B. Accordingly, flag CLK goes to the low value (0).

The microcontroller 108 thus determines in step 511 that flag CLK is not experiencing a CLK rising edge condition, and proceeds to step 514. In step 514, the microcontroller 108 resets the CLK rising flag (CLKRIS) to 0, copies the value of register TON2 (=0) into register TON1, and copies the value of the register TMR0 ($=t_2-t_1$) into register TON2.

As will be described later, the value of register TON2 is copied into register TON1, because as the register TON2 is being updated with the current value of the register TMR0, the previous value of the register TON2 now corresponds to what the current value of register TON1 should be. In other words, as shown in FIG. 20, the value of register TON1, which is intended to correspond to the time ($t_1-t_0$) that the CLK signal was high (1) immediately preceding the currently detected CLK falling edge condition (at time $t_2$), corresponds to the previous value of register TON2, which is intended to correspond to the time ($t_1-t_0$) (not shown) that flag CLK was high (1) immediately following the previously detected CLK falling edge condition (at time $t_0$) (not shown). However, during these initial processings after the system 100 has been powered up or reset, the value of TON2 is still "0" until it is replaced with the new value of the register TMR0.

Accordingly, at this time, the values of the registers TON1, TON2 and TOFF are as follows:

TON1=0
TOFF=0 (did not change).
TON2=$t_2-t_1$=TMR0

The processing then proceeds to step 515, where the microcontroller 108 determines the state of flag DAT to determine the direction of rotation of the indexed-encoder 102. Assuming, as indicated above, that the indexed-encoder 102 is continuing to rotate in the clockwise direction and the flags CLK and DAT are as shown at time $t_2$ in FIG. 20, the processing continues to the rotation clockwise (RCW) processing beginning in step 516 as shown in FIG. 23. As stated above, it is also presumed that the CLK edge condition detected in step 507 occurred before the register TMR0 reached its maximum value.

Because the indexed-encoder 102 is continuing to rotate in the clockwise direction, the microcontroller 108 will determine in step 517 that the clockwise direction flag CWR has already been set to 1. The microcontroller 108 will then proceed to step 518 where it will determine whether the flag TMAX has been set to 1.

Figure 24:
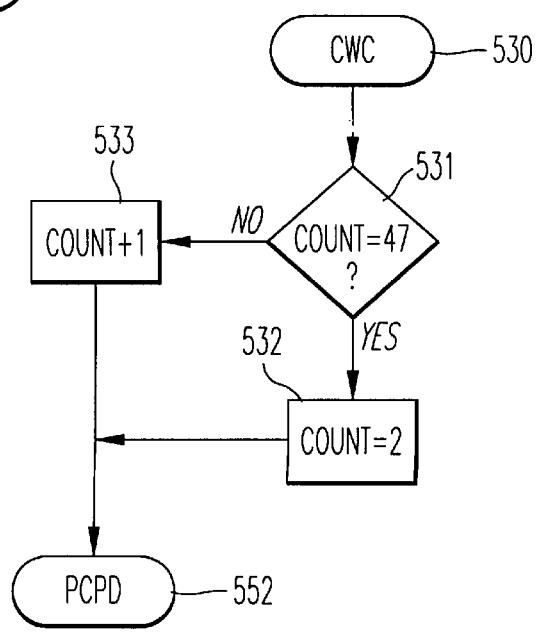
FIG. 24 is a flow diagram illustrating an example of the clockwise count (CWC) routine performed by the microcontroller system of the position sensor system shown in FIG. 1 when the microcontroller is incrementing the counter representative of the position of the indexed-encoder after having determined that the indexed-encoder is rotating in a clockwise direction.

If the state of flag TMAX is 1, the microcontroller 108 will not attempt to detect the index opaque space 122. Rather, the microcontroller will proceed to step 519, where it will reset the state of the flag TMAX to 0 and reset the values of registers TON1, TON2 and TOFF to 0 in step 521. Accordingly, if the flag TMAX is 1, the microcontroller 108 will skip to the clockwise tests (CWT) routine beginning at step 522 for detecting the index opaque space 122, and proceed to the clockwise count (CWC) routine beginning at step 530 as shown in FIG. 24 as explained above.

Figure 26:
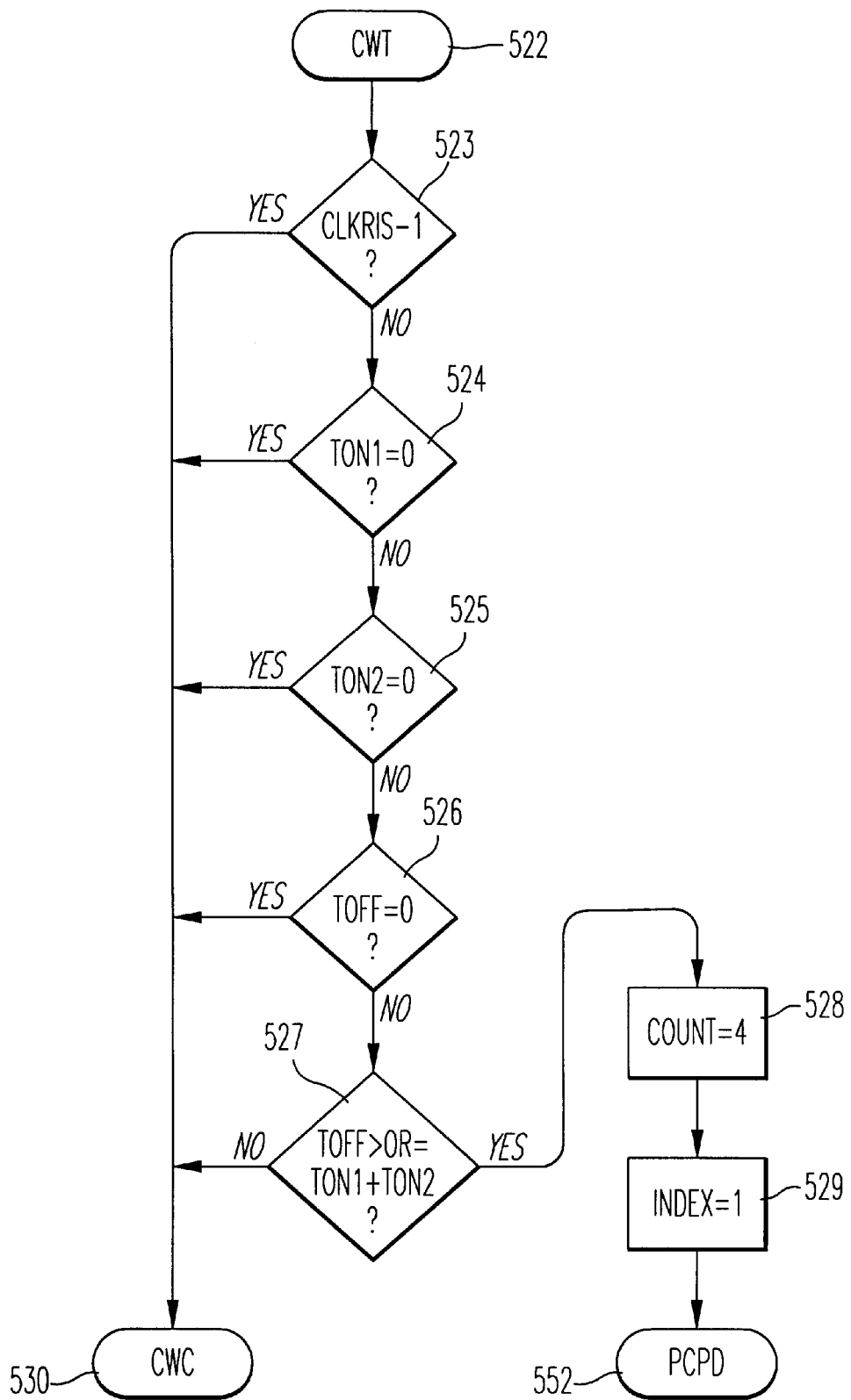
FIG. 26 is a flow diagram illustrating an example of the clockwise tests (CWT) routine performed by the microcontroller system of the position sensor system shown in FIG. 1 when the microcontroller system has determined that the indexed-encoder is rotating in a clockwise direction and the microcontroller system is attempting to detect the presence of the single index opaque space of the indexed-encoder.

However, since it is assumed that the state of flag TMAX is equal to 0 (the register TMR0 did not reach its maximum value), the processing will continue to the clockwise test (CWT) routine beginning at step 522 as shown in FIG. 26.

Specifically, the microcontroller 108 will determine if any of the conditions set forth in steps 523, 524, 525, 526 or if the "no" condition in step 527 have been fulfilled. If so, the microcontroller 108 will determine that the index opaque space 122 is not yet detectable, and proceed to the clockwise count (CWC) routine beginning at step 530 in FIG. 24 as described above.

In particular, if the microcontroller 108 determines in step 523 that the clock signal rising flag CLKRIS is equal to 1, the microcontroller 108 will not attempt to detect the presence of index opaque space 122 and thus proceed to the clockwise count (CWC) routine beginning at step 530. If, however, the microcontroller 108 has determined in step 523 that the clock signal rising flag CLKRIS was not equal to 1, the microcontroller 108 will proceed to step 524 to determine the value in the register TON1. As indicated in steps 524, 525, 526 and 527, if the value of any of the registers TON1, TON2 or TOFF is 0, or if the value of register TOFF is not equal to or greater than the combined value of registers TON1 and TON2, the processing proceeds to the clockwise count (CWC) routine beginning in step 530.

Figure 29:
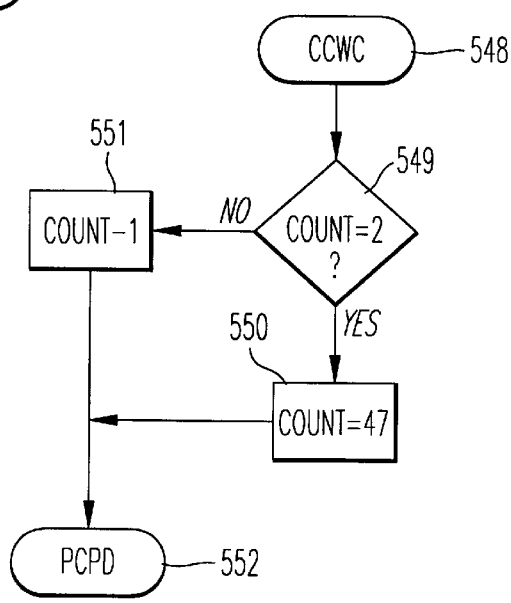
FIG. 29 is a flow diagram illustrating an example of the counter clockwise count (CCWC) routine performed by the microcontroller system of the position sensor system shown in FIG. 1 when the microcontroller is incrementing the counter representative of the position of the indexed-encoder after having determined that the indexed-encoder is rotating in a counterclockwise direction.

As indicated above, the value of TON1 is equal to 0. Hence, the processing proceeds from step 524 where this condition is detected, to the clockwise count (CWC) routine beginning at step 530 (FIG. 24), and the value of register COUNT is incremented by 1. Because the index opaque space 122 has not yet been determined, when the processing proceeds to the process count position display (PCPD) beginning at step 552 as shown in FIG. 29, the position calculating and display steps 554 and 555 will not be performed (because the value of register COUNT is still meaningless), and the processing will return to the read quadrature detector (RQD) step 504 (FIG. 13).

The processing then continues until the microcontroller 108 detects another CLK edge condition in step 507 at time $t_3$ as shown in FIG. 20. This means that the transparent space numbered count "47" (FIG. 21) is beginning to pass between the emitter 128 and detector 126-1 and thus, the detector 126-1 again begins to detect the light 132 emitted from emitter 128. Accordingly, flag CLK goes to the high value (1). As stated, it will again be presumed that this CLK edge condition occurred before the register TMR0 reached the maximum value.

As indicated, the processing then continues to clock rising edge (CRE) steps 510 and 511 (FIG. 15), where it will be presumed that the microcontroller 108 will detect the CLK rising condition after having detected the CLK edge condition in step 507 (FIG. 14). The processing then proceeds to step 512 where, as explained above, the CLK signal rising flag CLKRIS is set to "1", the value of register TOFF is set to the value of the register TMR0, and the register TMR0 is reset to "0".

At this time, the values of the registers TON1, TON2 and TOFF are as follows:

TON1=0

TOFF=$t_3$=$t_2$=TMR0

TON2=$t_2$-$t_1$

We will then presume that in step 513, the microcontroller 108 determines that flag DAT signal is at a low level (0), and that the microcontroller 108 thus concludes that the flags CLK and DAT at time $t_3$ have a relationship as shown in FIG. 20. The processing thus proceeds to the rotation clockwise (RCW) processing beginning at step 516 as shown in FIG. 23.

Because the indexed-encoder 102 is continuing to rotate in the clockwise direction, the microcontroller 108 will determine in step 517 that the clockwise rotation flag (CWR) has already been set to 1. The microcontroller 108 will then proceed to step 518 where it will determine whether the flag TMAX has been set to 1.

Since we will assume that the state of flag TMAX is equal to 0 (the register TMR0 did not reach its maximum value), the processing will continue to the clockwise tests (CWT) routine for clockwise rotation beginning at step 522 as shown in FIG. 26. Specifically, the microcontroller 108 will determine if any of the conditions set forth in steps 523, 524, 525 or 526 have been fulfilled, or if the "no" condition in step 527 has occurred. Because the state of flag CLKRIS is equal to 1, the microcontroller 108 will determine this condition in step 523 and proceed to the clockwise count (CWC) routine beginning at step 530 in FIG. 24 as described above, and increment the value register COUNT by one.

The processing will then proceed to the process count/ position display (PCPD) processing beginning at step 552 as shown in FIG. 25. The display processing in steps 554 and 555 are skipped because the index opaque space 122 has not been detected, and no position calculation and display will occur. The processing then returns to the read quadrature detector (RQD) step 504.

As the processing repeats beginning at step 504, and proceeds as shown in the flow charts of FIGS. 13 and 14, when the CLK edge condition has been detected in step 507, the processing will proceed to clock rising edge (CRE) step 510 in FIG. 15. It is presumed that the detected CLK edge condition occurred at time $t_4$ as shown in FIG. 20. This means that the index opaque space 122 numbered count "2" (FIG. 21) is beginning to pass between the emitter 128 and detector 126-1 and thus, begins blocking the light 132 from being detected by detector 126-1. Accordingly, flag CLK goes to the low value (0).

The microcontroller 108 thus determines in step 511 that the flag CLK is not a CLK rising condition, and proceeds to step 514. In step 514, the microcontroller 108 resets the CLK signal rising flag CLKRIS to 0, copies the value of register TON2 (=$t_2$-$t_1$) into register TON1, and copies the value of the register TMR0 ($t_4$-$t_3$) into register TON2, and the register TMR0 is reset to "0".

Accordingly, at this time, the values of the registers TON1, TON2 and TOFF are as follows:

TON1=$t_2$-$t_1$

TOFF=$t_3$-$t_2$

TON2=$t_4$-$t_3$=TMR0

The processing then proceeds to step 515, where the microcontroller 108 determines the state of flag DAT to determine the direction of rotation of the indexed-encoder 102. Assuming, as indicated above, that the indexed-encoder 102 is continuing to rotate in the clockwise direction and the flags CLK and DAT are as shown at time $t_4$ in FIG. 20, the processing continues to the rotation clockwise (RCW) routine beginning in step 516 as shown in FIG. 23. As stated above, it will also be presumed that the CLK edge condition detected in step 507 occurred before the register TMR0 reached its maximum value.

Because the indexed-encoder 102 is continuing to rotate in the clockwise direction, the microcontroller 108 will determine in step 517 that the clockwise rotation flag CWR has already been set to 1. The microcontroller 108 will then proceed to step 518 where it will determine whether the flag TMAX has been set to 1.

If the state of flag TMAX is 1, the microcontroller 108 will not attempt to detect the index opaque space 122. Rather, the microcontroller will proceed to step 519, where it will reset the state of the flag TMAX to 0 and reset the values of registers TON1, TON2 and TOFF to 0 in step 521. In this event the microcontroller 108 will be skipping the processing beginning at step 522 for clockwise tests (CWT), and proceed to the clockwise count (CWC) routine beginning at step 530 as shown in FIG. 24 as explained above.

However, since we will assume that the state of flag TMAX is equal to 0 (the register TMR0 did not reach its maximum value), the processing will continue to the clockwise tests (CWT) routine beginning at step 522 as shown in FIG. 26.

Specifically, the microcontroller 108 will determine if any of the conditions set forth in steps 523, 524, 525 or 526 have been fulfilled, or if the "no condition" in step 527 has occurred. If so, the microcontroller 108 will determine that the index opaque space 122 is not yet detectable, and proceed to the clockwise count (CWC) routine beginning at step 530 in FIG. 24 as described above.

Since, as indicated above, the state of the CLKRIS flag is not 1, and all the values of registers TON1, TON2 and TOFF are not 0, the microcontroller will proceed through steps 523, 523, 524, 525 and 526 to step 527, where it will determine if the value of register TOFF is greater than or equal to the combined values of registers TON1 and TON2. As indicated above, the value of register TON1 which corresponds to the time period $t_2-t_1$ in FIG. 20 during which the transparent space numbered count "45" passed between the detector 126-1 and the emitter 128. The value of TON2 equals the current (fourth) TMR0 value, which corresponds to the time period $t_4-t_3$ in FIG. 20 during which the transparent space numbered count "47" passed between the detector 126-1 and the emitter 128. The value of TOFF equals the third TMR0 value, which corresponds to the time period $t_3-t_2$ in FIG. 20 during which the opaque space 118 number count "46" passed between the detector 126-1 and the emitter 128.

As stated above, it is presumed that the indexed-encoder 102 is rotating at a relatively constant rate. Hence, because the length of opaque spaces 118 and transparent spaces 120 are nearly equal, it can be presumed that the time that elapses for any opaque space 118 or any transparent space 120 to pass between the detector 126-1 and emitter 128 is relatively constant when the indexed-encoder 102 is rotating at a relatively constant rate. Accordingly, the values of registers TON1, TON2 and TOFF are nearly equal.

Hence, the microcontroller 108 determines in step 527 that the value of TOFF is not equal to or greater than the sum of TON1 and TON2 (which is equal in this case to approximately twice that of TOFF). Therefore, the microcontroller 108 proceeds to the clockwise count (CWC) routine beginning at step 530 (FIG. 24), and the value of register COUNT is incremented by 1. Because the index opaque space 122 has not yet been determined, when the processing proceeds to the process count/position display (PCPD) beginning at step 552 as shown in FIG. 25, the calculate position from count and display position steps 554 and 555 will not be performed, and the processing will return to the read quadrature detector (RQD) step 504 (FIG. 13).

The processing then continues until the microcontroller 108 detects another CLK edge condition in step 507 at time $t_5$ as shown in FIG. 20. This means that the transparent space numbered count "3" (FIG. 21) is beginning to pass between the emitter 128 and detector 126-1 and thus, the detector 126-1 again begins to detect the light 132 emitted from emitter 128. Accordingly, the flag CLK goes to the high value (1). As stated, it will again be presumed that this CLK edge condition occurred before the register TMR0 reached the maximum value.

As indicated, the processing then continues to clock rising edge (CRE) steps 510 and 511 (FIG. 15), where it will be presumed that the microcontroller 108 will determine that the CLK edge condition detected in step 507 (FIG. 14) is a CLK rising condition. The processing then proceeds to step 512 where, as explained above, the CLK rising flag CLKRIS is set to "1", the state of flag TOFF is set to the value of the register TMR0, and the register TMR0 is reset to "0".

At this time, the values of the registers TON1, TON2 and TOFF are as follows:

TON1=second TMR0 value (did not change)=$t_2-t_1$
TOFF=current (fifth) TMR0 value. =$t_5-t_4$
TON2=fourth TMR0 value (did not change)=$t_4-t_3$ It is noted, however, that at time $t_5$ shown in FIG. 20, the value of the register TMR0 represents the time that has elapsed for the index opaque space 122 to pass between the detector 126-1 and emitter 128. As explained above, the length of the index opaque space 122 is approximately three times the length of any of the other opaque spaces 118 or transparent spaces 120. Accordingly, the current (fifth) TMR0 value is essentially three times the value of any of the previous second and fourth register TMR0 values. Hence, the value of TOFF is equal to this larger fifth TMR0 value, which will be instrumental in enabling the microcontroller 108 to detect the index opaque space 122 as described later.

It will then be presumed that in step 513, the microcontroller 108 determines that the flag DAT is at a low level (0), and that the microcontroller 108 thus determines that the flags CLK and DAT at time $t_5$ have a relationship as shown in FIG. 20. The processing thus proceeds to the rotation clockwise routine (RCW) beginning at step 516 as shown in FIG. 23.

Because the indexed-encoder 102 is continuing to rotate in the clockwise direction, the microcontroller 108 will determine in step 517 that the clockwise rotation flag CWR has already been set to 1. The microcontroller 108 will then proceed to step 518 where it will determine whether the flag TMAX has been set to 1.

Since it is assumed that the state of flag TMAX is equal to 0 (the register TMR0 did not reach its maximum value), the processing will continue to the clockwise tests (CWT) routine beginning at step 522 as shown in FIG. 26. Specifically, the microcontroller 108 will determine if any of the conditions set forth in steps 523, 524, 525 or 526 have been fulfilled, or if the "no" condition in step 527 has occurred. Because the state of flag CLKRIS is equal to 1, the microcontroller 108 will determine this condition in step 523 and proceed to the clockwise count (CWC) routine beginning at step 530 in FIG. 24 as described above, and increment the value of register COUNT by one.

The processing will then proceed to the process count/position display (PCPD) processing beginning at step 552 as shown in FIG. 25. The display processing in steps 554 and 555 are skipped because the index opaque space 122 has not been detected, and no displaying will occur. The processing then returns to the read quadrature detector (RQD) step 504.

As the processing repeats beginning at step 504, and proceeds as shown in the flow charts of FIGS. 13 and 14, when the CLK edge condition has been detected in step 507, the processing will proceed to clock rising edge (CRE) step 510 in FIG. 15. It is presumed that the detected CLK edge condition occurred at time $t_6$ as shown in FIG. 20. This means that the index opaque space numbered count "4" (FIG. 21) is beginning to pass between the emitter 128 and detector 126-1 and thus, begins blocking the light 132 from being detected by detector 126-1. Accordingly, the flag CLK goes to the low value (0).

The microcontroller 108 thus determines in step 511 that flag CLK is not experiencing a CLK rising condition, and proceeds to step 514. In step 514, the microcontroller 108 resets the CLK signal rising flag CLKRIS to 0, copies the value of register TON2 into register TON1, and copies the value of the register TMR0 into register TON2, and the register TMR0 is reset to "0".

Accordingly, at this time, the values of the registers TON1, TON2 and TOFF are as follows:

TON1=previous TON2=fourth TMR0 value=$t_4$-$t_3$
TOFF=fifth TMR0 value (did not change). =$t_5$-$t_4$
TON2=Current (sixth) TMR0 value=$t_6$-$t_5$ The processing then proceeds to step 515, where the microcontroller 108 determines the state of flag DAT to determine the direction of rotation of the indexed-encoder 102. Assuming, as indicated above, that the indexed-encoder 102 is continuing to rotate in the clockwise direction and the flags CLK and DAT are as shown at time $t_6$ in FIG. 20, the processing continues to the rotation clockwise (RCW) routine beginning in step 516 as shown in FIG. 23. As stated above, it is also presumed that the CLK edge condition detected in step 507 occurred before the register TMR0 reached its maximum value.

Because the indexed-encoder is continuing to rotate in the clockwise direction, the microcontroller 108 will determine in step 517 that the clockwise rotation flag CWR has already been set to 1. The microcontroller 108 will then proceed to step 518 where it will determine whether the flag TMAX has been set to 1.

If the state of flag TMAX is 1, the microcontroller 108 will not attempt to detect the index opaque space 122. Rather, the microcontroller will proceed to step 519, where it will reset the state of the flag TMAX to 0 and reset the values of registers TON1, TON2 and TOFF to 0 in step 521. Accordingly, the microcontroller 108 will skip the processing beginning at step 522 for detecting the index opaque space 122, and proceed to the clockwise count (CWC) routine beginning at step 530 as shown in FIG. 24 as explained above.

However, since it is assumed that the state of flag TMAX is equal to 0 (the register TMR0 did not reach its maximum value), the processing will continue to the clockwise tests (CWT) routine beginning at step 522 as shown in FIG. 26.

Specifically, the microcontroller 108 will determine if any of the conditions set forth in steps 523, 524, 525 or 526 have been fulfilled, or if the "no" condition in step 527 has occurred. If so, the microcontroller 108 will determine that the index opaque space 122 is not yet detectable, and proceed to the clockwise counting routine beginning at step 530 in FIG. 24 as described above.

Since, as indicated above, the state of the CLKRIS flag is not 1, and all the values of TON1, TON2 and TOFF are not 0, the microcontroller will proceed through steps 523, 523, 524, 525 and 526 to step 527, where it will determine if the value of TOFF is greater than or equal to the combined values of TON1 and TON2. As indicated above, the value of TON1 equals the fourth TMR0 value, which corresponds to the time period $t_4$-$t_3$ in FIG. 20 during which the transparent space numbered count "47" passed between the detector 126-1 and the emitter 128.

The value of TON2 equals the current (sixth) TMR0 value, which corresponds to the time period $t_6$-$t_5$ in FIG. 20 during which the transparent space numbered "3" passed between the detector 126-1 and the emitter 128. The value of TOFF equals the fifth TMR0 value, which corresponds to the time period $t_5$-$t_4$ in FIG. 20 during which the index opaque space numbered count "2" passed between the detector 126-1 and the emitter 128.

As stated above, it is presumed that the indexed-encoder 102 is rotating at a relatively constant rate. Hence, because the length of the transparent spaces 120 are nearly equal, it can be presumed that the time that elapses for any transparent space 120 to pass between the detector 126-1 and emitter 128 is relatively constant when the indexed-encoder 102 is rotating at a relatively constant rate. Accordingly, the values of TON1 and TON2 are nearly equal.

However, as explained above, because the index opaque space 122 is essentially three times as long as any of the transparent spaces 120, the value of TOFF is greater than the combined values of TON1 and TON2 in this case. Accordingly, the microcontroller 108 determines in step 527 that the value of TOFF is equal to or greater than the sum of TON1 and TON2 (which is equal in this case to approximately ⅔ that of TOFF). Therefore, the microcontroller 108 proceeds to step 528, where it will set the value of register COUNT to 4. As shown at time $t_6$ in FIG. 20, this indicates that the opaque space numbered count "4" (FIG. 22) on the indexed-encoder 102 is beginning to pass between the detector 126-1 and emitter 128. The processing will then proceed to step 529, where the microcontroller 108 will set the flag INDEX to "1", thus indicating that the index opaque space 122 has been detected. It is noted that once this flag INDEX has been set to 1, it will remain at 1 until either the power of the system 100 has been turned off or the system 100 has been reset.

It is further noted that since the length of the index opaque space 122 is at or approximately three times the length of any of the transparent spaces 120, the system 100 configured in this manner virtually ignores any acceleration or deceleration in the movement of the indexed-encoder 122.

The processing will then continue to the process count/position display (PCPD) processing at step 552 in FIG. 25. The microcontroller 108 will determine in step 553 that the flag INDEX is now equal to 1 and thus, will proceed to step 554 where it will calculate the POSITION from the value of the register COUNT. This POSITION corresponds to the position on the indexed-encoder 102 represented by the register COUNT, and can be equal to the position indicated by register COUNT (e.g., at this time, position "4").

Alternatively, the indexed-encoder 102 can be used in conjunction with a wheel having a different number of positions. For instances, as shown in the table of FIGS. 27A and 27B, if the indexed-encoder 102 is coupled to a 16 position wheel, such as a wheel of a slot machine game, a division by 3 is performed on the value of the register COUNT to ascertain the POSITION of the 16 position wheel. That is, the quotient of count divided by 3 becomes POSITION.

In other words, in this example, each position of the 16 position wheel corresponds to the positions of either two opaque spaces 118 and one transparent space 120, or two transparent spaces 120 and one opaque space 118. Also, since the length of the index opaque space 122 is equal to 3 regular opaque spaces 118 (or 3 transparent spaces 120), the index opaque space 122 position corresponds to one POSITION of the 16 position wheel. In this example, the index opaque space 122 which is numbered COUNT "2" (FIG. 22) on the indexed-encoder is calculated to be the first or "0" POSITION on the 16 position wheel. As further indicated, the next three COUNTS (3, 4, 5) on the indexed-encoder 102 are calculated to be POSITION "1" on the 16 position wheel, the next three counts (6, 7, 8) are calculated to be POSITION "2" on the 16 position wheel, and so on.

In step 555, the microcontroller 108 can then output signals representative of the POSITION calculated in step 554 to control the display system 112 to generate a display indicative of the calculated POSITION. For instance, if the display system 112 is like that shown in FIG. 12, the LED driver 144 converts the microcontroller signals to output signals which, for example, light one LED 142, as appropriate indicating 1 of 16 wheel position. As stated above, the display system 112 can include any type of display device known in the art. Alternatively, the microcontroller 108 can use the calculated POSITION internally for game processing functions, for example. Also, the signals output by the microcontroller 108 that are representative of the calculated POSITION can be provided to another processor, if desired, for further processing, if the application in which the system 100 is being use so requires.

It should be further noted that the POSITION value calculated in step 554 can be calculated to be any integer value, as long as that value is based on the COUNT of the indexed-encoder 102. For instance, if the wheel to which the indexed-encoder 102 is coupled has only 4 positions, the indexed opaque space 122 numbered COUNT "2" and the opaque spaces 118 and transparent spaces numbered 3–11 could correspond to the POSITION "0" on the wheel, the opaque space and transparent spaces numbered 12 through 23 would correspond to the POSITION "1", and so on.

After performing step 555, the processing returns to the read quadrature detector (RQD) step 504 (FIG. 13). If it is presumed that the indexed-encoder 102 is continuing to rotate in the clockwise direction, the relationship of flags CLK and DAT will remain as shown in FIG. 20. Hence, the next CLK edge condition will occur at time $t_7$.

When this CLK edge condition is detected at time $t_7$, it means that the transparent space numbered COUNT "5" (FIG. 21) is beginning to pass between the emitter 128 and detector 126-1 and thus, the detector 126-1 again begins to detect the light 132 emitted from emitter 128. Accordingly, the CLK signal goes to the high value (1). As stated, it will again be presumed that this CLK edge condition occurred before the register TMR0 reached the maximum value, which is checked in step 508 (FIG. 14).

As indicated, the processing then continues to steps 510 and 511 (FIG. 15), where it is presumed that the microcontroller 108 will detect the CLK rising edge condition after having detected the CLK edge condition in step 507 (FIG. 14). The processing then proceeds to step 512 where, as explained above, the CLK signal rising flag CLKRIS is set to "1", the value of register TOFF is set to the value of the register TMR0, and the register TMR0 is reset to "0".

At this time, the values of the registers TON1, TON2 and TOFF are as follows:

TON1=fourth TMR0 value (did not change)=$t_4-t_3$
TOFF=current (seventh) TMR0 value. =$t_7-t_6$
TON2=sixth TMR0 value (did not change)=$t_6-t_5$ It is noted that at time $t_7$ shown in FIG. 20, the value of the register TMR0 represents the time that has elapsed for the opaque space numbered COUNT "4" (FIG. 21) to pass between the detector 126-1 and emitter 128. It will then be presumed that in step 513, the microcontroller 108 determines that flag DAT is at a low level (0) while the flag CLK is rising, and that the microcontroller 108 thus determines that flags CLK and DAT have a relationship as shown at time $t_7$ in FIG. 20. The processing thus proceeds to the rotation clockwise (RCW) processing beginning at step 516 as shown in FIG. 23.

Because the indexed-encoder 102 is continuing to rotate in the clockwise direction, the microcontroller 108 will determine in step 517 that the clockwise direction flag CWR has already been set to 1. The microcontroller 108 will then proceed to step 518 where it will determine whether the flag TMAX has been set to 1.

Since it is assumed that the state of flag TMAX is equal to 0 (the register TMR0 did not reach its maximum value), the processing will continue to the clockwise tests (CWT) routine beginning at step 522 as shown in FIG. 26. Specifically, the microcontroller 108 will determine if any of the conditions set forth in steps 523, 524, 525 or 526 have been fulfilled, or if the "no" condition in step 527 has occurred. Because the state of flag CLKRIS is equal to 1, the microcontroller 108 will determine this condition in step 523 and proceed to the clockwise count (CWC) routine beginning at step 530 in FIG. 24 as described above, and increment the value register COUNT by 1, so that the value of COUNT now is "5".

The processing will then proceed to the process count/position display (PCPD) processing beginning at step 552 as shown in FIG. 25. The display processing in steps 554 and 555 are performed because the index opaque space 122 has been detected, and thus, displaying will occur. The processing then returns to the read quadrature detector (RQD) step 504.

It is noted, however, that since the single index opaque space 122 has already been detected and the power has not been shut off and the system 100 has not been reset, it is not necessary to attempt to again detect the single index opaque space 122. In the event that the index opaque space 122 does again pass between the detector 126-1 and emitter 128 as the indexed-encoder 102 continues to rotate in the clockwise direction such that the value of TOFF is determined to be greater than or equal to the sum of TON1 and TON2 in step 527, the processing will proceed to step 528 where register COUNT will be set to "4", and then subsequently to step 529 where INDEX flag will be set to "1".

Although, as discussed above, it is not necessary to check for the index opaque space 122 again unless the power of the system 100 has been shut off or the system 100 has been reset, this processing in steps 528 and 529 for each subsequent detection of the index opaque space 122 provides a check for every rotation, which provides added assurance that the numbered counts of the indexed-encoder 102 are being monitored accurately.

As long as the indexed-encoder 102 does not begin to rotate in the opposite, counterclockwise direction by an amount sufficient to create a CLK edge condition, the processing continues essentially as described above. As discussed above, because the value of register TMR0 is used only in the detection of the index opaque space 122, the clockwise count (CWC) routine shown in FIG. 24 will be performed at the periodic times during the program even if movement of the indexed-encoder 102 slows down to a rate at which the register TMR0 could reach its maximum value before a CLK edge condition is detected at step 507 (FIG. 14), or stops entirely and then resumes clockwise movement (without moving counterclockwise by an amount sufficient to create a CLK edge condition).

However, if the indexed-encoder 102 begins to move in the counterclockwise direction and causes a CLK edge condition in that direction, then the counterclockwise processing shown in FIGS. 28–30 that will now be described is performed by the microcontroller 108. As can be appreciated from the following, the counterclockwise processing is similar to the clockwise processing described above for the clockwise movement with regard to detection of the index opaque space 122. However, as will be described below, the counterclockwise count (CCWC) routine performed in FIG. 29 decrements the register COUNT by 1 for every counterclockwise edge detected on the indexed-encoder 102.

For instance, if it is presumed that the indexed-encoder 102 begins to move in the counterclockwise direction after the transparent space numbered COUNT 5 (FIG. 21) has just passed through the location between the detector 126-1 and emitter 128 in the clockwise direction ($t_7$ in FIG. 20), the opaque space 118 numbered COUNT "4" ($t_0$ in FIG. 22) will again pass between the detector 126-1 and emitter 128 (although in the counterclockwise direction). That is, as the processing repeats beginning at step 504 and proceeds as shown in the flow charts of FIGS. 13 and 14, when the change in the state of flag CLK has been detected in step 507 (FIG. 14), the processing will proceed to clock rising edge (CRE) step 510 in FIG. 15. It is presumed that the detected falling clock edge condition occurred at time $t_0$ as shown in FIG. 22. This means that the opaque space 118 numbered COUNT "4" (FIG. 21) is beginning to pass between the emitter 128 and detector 126-1 and thus, begins blocking the light 132 from being detected by detector 126-1. Accordingly, the CLK signal goes to the low value (0).

The microcontroller 108 thus determines in step 511 that the CLK signal is not experiencing a CLK rising condition, and proceeds to step 514. In step 514, the microcontroller 108 resets the CLK signal rising flag CLKRIS to 0, copies the value of register TON2 into register TON1, and copies the value of the register TMR0 into register TON2 in the manner described above.

Presuming that the values of TON1, TON2 and TOFF were as at time $t_7$ discussed above, the values of TON1, TON2 and TOFF are now as follows:

TON1=TON2 (from time $t_7$ above)=$t_6$-$t_5$

TOFF=TOFF from above (did not change).=$t_7$-$t_6$

TON2=current TMR0=not valid due to direction change

The processing then proceeds to step 515, where the microcontroller 108 will compare the relationship between the CLK and DAT flags to determine the direction of rotation of the indexed-encoder 102. Assuming, as indicated above, that the indexed-encoder 102 is now rotating in the counterclockwise direction and the flags CLK and DAT are as shown at time $t_0$ in FIG. 22, the processing continues to the counterclockwise rotation processing beginning in step 534 as shown in FIG. 28.

Figure 23:
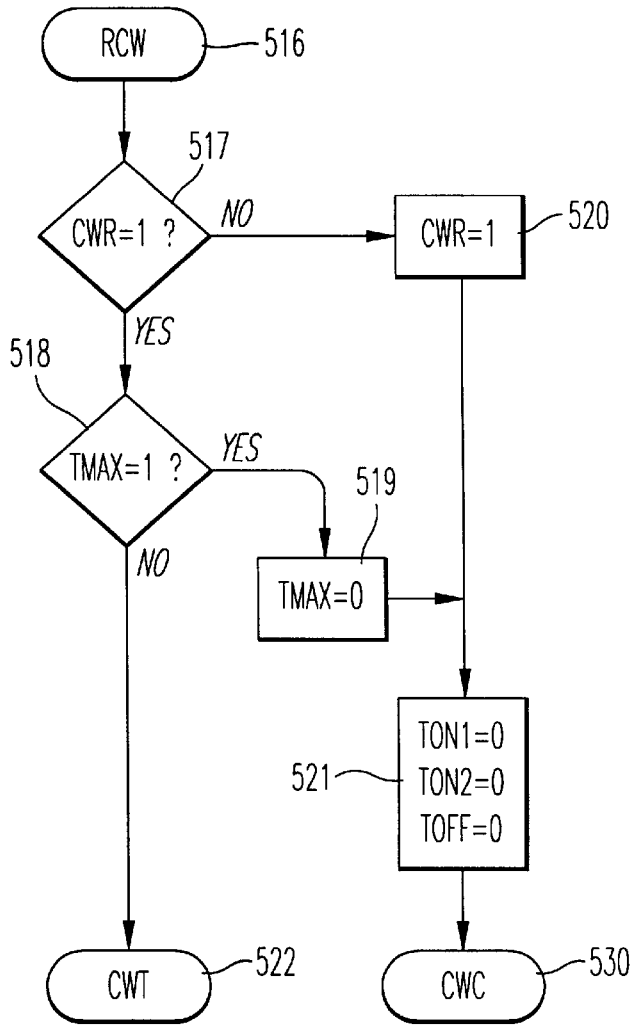
FIG. 23 is a flow diagram illustrating an example of the rotation clockwise (RCW) routine performed by the microcontroller system of the position sensor system shown in FIG. 1 when the microcontroller system has determined that the indexed-encoder is rotating in a clockwise direction.
Figure 28:
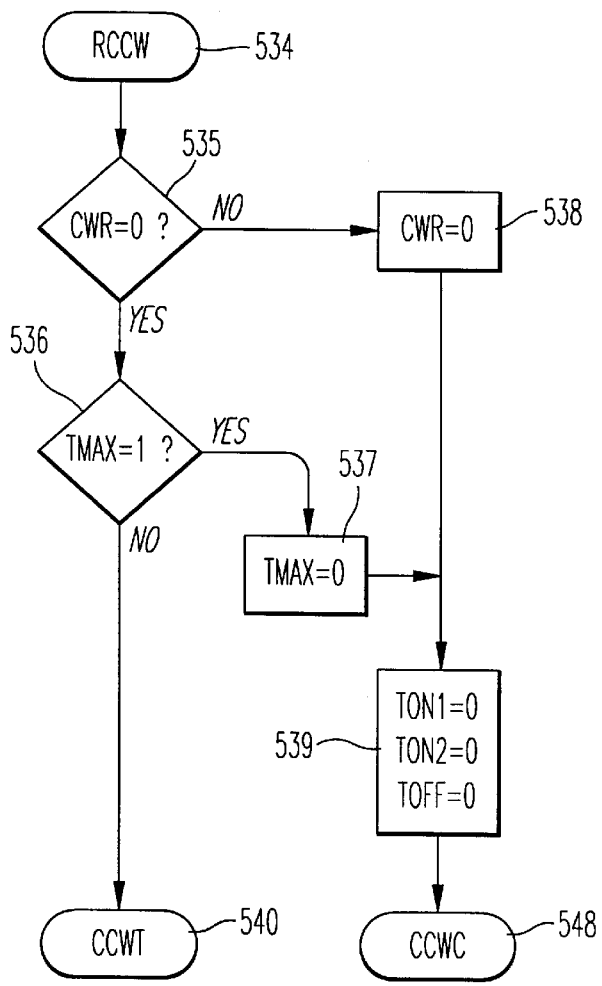
FIG. 28 is a flow diagram illustrating an example of rotation counter clockwise (RCCW) routine performed by the microcontroller system of the position sensor system shown in FIG. 1 when the microcontroller system has determined that the indexed-encoder is rotating in a counterclockwise direction.

As can be appreciated from FIG. 28, the rotation counterclockwise (RCCW) processing beginning in step 534 is similar to the rotation clockwise (RCW) processing beginning in step 516 as shown in the flowchart of FIG. 23. Because the indexed-encoder 102 has now just started continuing to rotate in the counter clockwise direction, the microcontroller 108 will determine in step 535 that the clockwise rotation flag CWR is not 0 and thus, will proceed to step 538 where it will set flag CWR to 0, thereby indicating counterclockwise rotation.

The values of registers TON1, TON2 and TOFF are all reset to 0 in step 539, and the microcontroller 108 proceeds to the counterclockwise count (CCWC) routine beginning at step 548 in the flowchart shown in FIG. 29. The microcontroller 108 then proceeds from step 548 to step 549 where it determines whether the value of register COUNT is equal to 2, which is the minimum COUNT number on the indexed-encoder 102 as shown in FIG. 21. As indicated, if the value of register COUNT is equal to the minimum 2, the state of flag COUNT is set to 47 in step 550.

However, the register COUNT is "5" because the transparent space numbered COUNT "5" on the indexed-encoder 102 was between the detector 1261 and emitter 128, and the opaque space 118 numbered COUNT "4" on the indexed-encoder 108 is now entering the location between the detector 126-1 and emitter 128. Hence, in step 549, the microcontroller 108 determines that the value of the register COUNT is not equal to its minimum value (i.e., 2), and the processing continues to step 551 where the value of register COUNT is decremented by 1, and thus has a value of "4". The processing will then proceed to the process count/position display (PCPD) processing beginning at step 552 as shown in FIG. 25.

The microcontroller 108 will proceed from step 552 to determine in step 553 whether the index opaque space 122 has been located by checking the state of flag INDEX. Since the index opaque space 122 has already been detected and the system 100 was not reset or the power was not turned off, the display processing in steps 554 and 555 are performed, and displaying will occur.

The processing returns to step 504, and either the clockwise processing or the counterclockwise processing described above is repeated, depending on the movement of the indexed-encoder 102.

Figure 30:
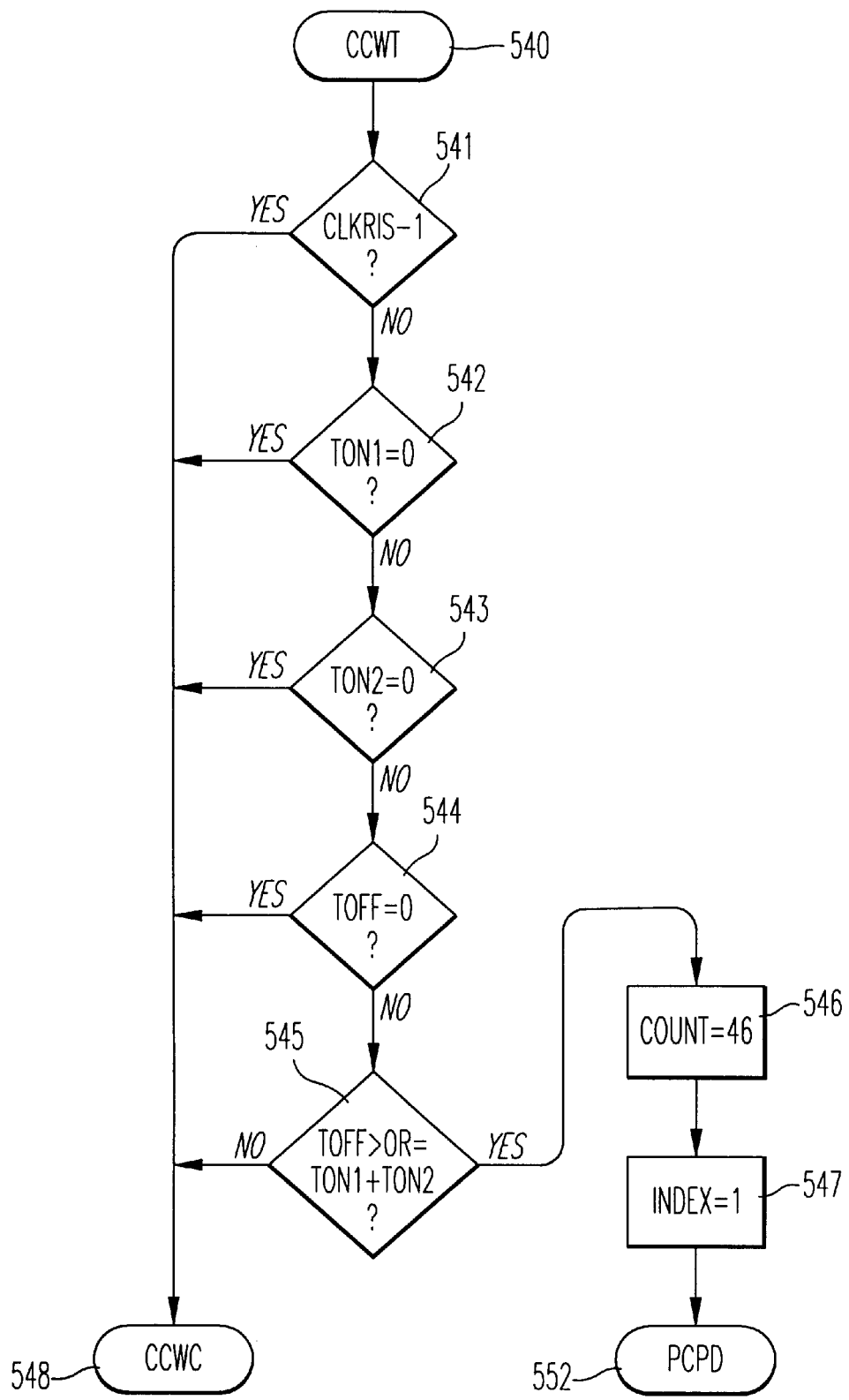
FIG. 30 is a flow diagram illustrating an example of the counter clockwise tests (CCWT) routine performed by the microcontroller system of the position sensor system shown in FIG. 1 when the microcontroller system has determined that the indexed-encoder is rotating in a counterclockwise direction and the microcontroller system is attempting to detect the presence of the single index opaque space of the indexed-encoder.

As can further be appreciated from the flowcharts shown in FIGS. 28–30 relating to the counterclockwise rotation, the processing for detecting the index opaque space 122 when the indexed-encoder 102 is rotating in the counterclockwise direction is essentially identical to the corresponding processing described above for clockwise rotation. The counterclockwise index opaque space detection processing will now be briefly described.

For purposes of explanation, it will be assumed that an interruption of the power of the system 100 occurred (or the system 100 was reset) when the indexed-encoder 102 is positioned such that the transparent space numbered COUNT "3" in FIG. 21 is about to pass between the emitter 128 and detector 126-1, and the indexed-encoder 102 is moving in a counterclockwise direction sufficient for the microcontroller 108 to detect each CLK edge condition in step 507 (FIG. 14) before the register TMR0 reaches its maximum value. However, as with the clockwise processing, the microcontroller 108 is capable of detecting the index opaque space 122 regardless of the initial position of the indexed-encoder 102.

Since it is presumed that the transparent space 120 numbered COUNT "3" of the indexed-encoder 102 is the first "space" to begin passing between the emitter 128 and detector 126-1 (time $t_1$ in FIG. 22), the microcontroller 108 will determine that the CLK edge condition detected in step 507 (FIG. 14) is a CLK rising edge in step 511 (FIG. 15). The processing then proceeds to step 512 where, as explained above, the CLK rising flag CLKRIS is set to "1", the value of register TMR0 is copied to register TOFF, and register TMR0 is reset to "0". The values of TON1, TON2 and TOFF at this time are as follows:

TON1=0

TOFF=current (first) TMR0=$t_1-t_0$
TON2=0

In step 513, if the microcontroller 108 determines that the state of flag DAT is at a high level (1), the microcontroller 108 determines that the flags CLK and DAT have a relationship at time $t_1$ as shown in FIG. 22 and thus, determines that the indexed-encoder 102 is rotating in a counterclockwise direction. In this event, the processing proceeds to the rotation counterclockwise (RCCW) processing beginning at step 534 in FIG. 28. However, if the microcontroller 108 determines that the flag DAT is low (0), then the microcontroller 108 determines that the indexed-encoder 102 is rotating in a clockwise direction and proceeds with the rotation clockwise (RCW) processing described above.

Because it is presumed that the state of flag DAT is high (1) as shown at time $t_1$ in FIG. 22 because the indexed-encoder 102 is rotating in a counterclockwise direction), the microcontroller 108 will determine that the indexed-encoder 102 is moving in a counterclockwise direction, and proceed to the rotation counterclockwise (RCCW) processing beginning at step 534. After beginning the rotation counterclockwise (RCCW) processing in step 534, the processing proceeds to step 535, where the microcontroller 108 checks the state of the clockwise rotation flag CWR to ascertain whether the indexed-encoder 102 was previously not rotating in a clockwise direction. If the indexed-encoder 102 was not rotating in a clockwise direction (CWR=0), the processing proceeds to step 536 where the microcontroller 108 determines whether the state of flag TMAX has been set to 1 (indicating that the clock TMR0 has reached the maximum value).

As stated above, this is the first counterclockwise rotation processing being performed after the first CLK edge condition after the system 100 was reset or experienced a power interruption. Accordingly, the microcontroller 108 will have reset the clockwise rotation flag CWR to 0 in step 502 (FIG. 13) and thus will determine in step 535 that the clockwise rotation flag CWR is equal to "0", and proceed to step 536.

If the state of flag TMAX is 1, the microcontroller 108 will not attempt to detect the index opaque space 122. Rather, the microcontroller will proceed to step 537, where it will reset the state of flag TMAX to 0 and reset the values of registers TON1, TON2 and TOFF to 0 in step 539. Accordingly, the microcontroller 108 will skip the (CCWT) processing beginning at step 540 for detecting the index opaque space 122, and proceed to the counterclockwise counting (CCWC) routine beginning at step 548 as shown in FIG. 29.

However, since it is assumed that the state of flag TMAX is equal to 0 (the register TMR0 did not reach its maximum value), the processing will continue to the counter clockwise tests (CCWT) routine for counterclockwise rotation beginning at step 540 as shown in FIG. 30. Specifically, the microcontroller 108 will determine if any of the conditions set forth in steps 541, 542, 543 or 544, if the "no" condition in step 545 has occurred, have been fulfilled. If so, the microcontroller 108 will determine that the index opaque space 122 is not yet detectable, and proceed to the counterclockwise count (CCWC) routine beginning at step 548 in FIG. 29 as described above.

In particular, if the microcontroller 108 determines in step 541 that the state of CLK rising flag CLKRIS is equal to 1, the microcontroller 108 will not attempt to detect the presence of index opaque space 122 and thus proceed to the counterclockwise count (CCWC) routine beginning at step 548. If, however, the microcontroller 108 has determined in step 541 that the CLK rising flag was detected as falling, the microcontroller 108 will proceed to step 542 to determine the value in register TON1. As indicated in steps 542, 543, 544 and 545, if the value of any of the registers TON1, TON2 or TOFF is 0, or if TOFF is not greater than or equal to the combined value of TON1 and TON2, the processing proceeds to the counterclockwise count (CCWC) routine beginning in step 548.

As indicated above, the state of flag CLKRIS is equal to 0. Hence, the processing proceeds from step 541 where this condition is detected, to step 542. In step 542, it is determined that the value of TON1=0 and thus, the processing proceeds to the counterclockwise count (CCWC) routine beginning at step 548, and the value of the count register COUNT is decremented by 1. Because the index opaque space 122 has not yet been determined, the value of register COUNT is essentially meaningless. Hence, when the processing proceeds to the process count/position display (PCPD) processing beginning at step 552 as shown in FIG. 25, the position calculating and display steps 554 and 555 will not be performed, and the processing will return to the read quadrature detector (RQD) step 504 (FIG. 13).

As stated above, for explanatory purposes, it will be assumed that the indexed-encoder 102 continues to rotate in the counterclockwise direction.

Accordingly, as the processing repeats beginning at step 504 and proceeds as shown in the flow charts of FIGS. 13 and 14, when the CLK edge condition has been detected in step 507, the processing will proceed to step 510 in FIG. 15.

It is presumed that the detected clock edge condition occurred at time $t_2$ as shown in FIG. 22. This means that the index opaque space 122 numbered COUNT "2" (FIG. 21) is beginning to pass between the emitter 128 and detector 126-1 and thus, begins blocking the light 132 from being detected by detector 126-1. Accordingly, the CLK signal goes to the low value (0), and the state of flag CLK goes to the low value (0).

The microcontroller 108 thus determines in step 511 that the flag CLK is not a rising condition, and proceeds to step 514. In step 514, the microcontroller 108 resets the CLK rising flag CLKRIS to 0, copies the value of register TON2 into register TON1, and copies the value of the register TMR0 into register TON2, and the register TMR0 is reset to "0". Accordingly, at this time, the values of the registers TON1, TON2 and TOFF are as follows:

TON1=0
TOFF=first TMR0 value (did not change)=$t_1-t_0$
TON2=current (second) TMR0 value=$t_2-t_1$ (FIG. 22).

The processing then proceeds to step 515, where the microcontroller 108 determines the state of flag DAT to determine the direction of rotation of the indexed-encoder 102. Assuming, as indicated above, that the indexed-encoder 102 is continuing to rotate in the counterclockwise direction and the signals CLK and DAT are as shown at time $t_2$ in FIG. 22, the processing continues to the rotation counterclockwise (RCCW) routine beginning in step 534 as shown in FIG. 28. As stated above, it will also be presumed that the CLK edge condition detected in step 507 occurred before the register TMR0 reached its maximum value.

Because the indexed-encoder 102 is continuing to rotate in the counterclockwise direction, the microcontroller 108 will determine in step 535 that the clockwise rotation flag CWR has already been set to 0. The microcontroller 108 will then proceed to step 536 where it will determine whether the flag TMAX has been set to 1.

If the value of the register TMAX is 1, the microcontroller 108 will not attempt to detect the index opaque space 122. Rather, the microcontroller will proceed to step 537, where it will reset the state of the flag TMAX to 0 and reset the values of registers TON1, TON2 and TOFF to 0 in step 539. In this event, the microcontroller 108 will skip the processing beginning at step 540 for detecting the index opaque space 122, and proceed to the counterclockwise count (CCWC) routine beginning at step 548 as shown in FIG. 29.

However, since it will be assumed that the state of flag TMAX is equal to 0 (the register TMR0 did not reach its maximum value), the processing will continue to counterclockwise tests (CCWT) routine for counterclockwise rotation beginning at step 540 as shown in FIG. 30.

Specifically, the microcontroller 108 will determine if any of the conditions set forth in steps 541, 542, 543 or 544 have been fulfilled, or if the "no" condition in step 545 has occurred. If so, the microcontroller 108 will determine that the index opaque space 122 is not yet detectable, and proceed to the counterclockwise counting routine beginning at step 548 in FIG. 29 as described above.

In particular, the microcontroller 108 determines in step 542 that the value of TON1 is equal to 0. Hence, the processing proceeds from step 542 where this condition is detected, to the counterclockwise count (CCWC) routine beginning at step 548, and the value of register COUNT is decremented by 1. Because the index opaque space 122 has not yet been determined, the value of COUNT is meaningless. Hence, when the processing proceeds to the process count/position display (PCPD) processing beginning at step 552 as shown in FIG. 25, the position calculating and display steps 554 and 555 will not be performed, and the processing will return to the read quadrature detector (RQD) step 504 (FIG. 13).

The processing then continues until the microcontroller 108 detects another CLK edge condition in step 507 at time $t_3$ as shown in FIG. 22. This means that the transparent space numbered COUNT "47" (FIG. 21) is beginning to pass between the emitter 128 and detector 126-1 and thus, the detector 126-1 again begins to detect the light 132 emitted from emitter 128. Accordingly, the flag CLK goes to the high value (1). As stated, it will again be presumed that this CLK edge condition occurred before the register TMR0 reached the maximum value.

As indicated, the processing then continues to steps 510 and 511 (FIG. 15), where it will be presumed that the microcontroller 108 will detect the CLK rising condition after having detected the CLK edge condition in step 507 (FIG. 14). The processing then proceeds to step 512 where, as explained above, the CLK rising flag CLKRIS is set to "1", the register TMR0 is copied to register TOFF, and register TMR0, and the register TMR0 is reset to "0".

At this time, the values of the registers TON1, TON2 and TOFF are as follows:
TON1=0 (did not change)
TOFF=current (third) TMR0 value. $=t_3-t_2$ (FIG. 22)
TON2=second TMR0 value (did not change)$=t_2-t_1$ (FIG. 22)

It is noted, however, that at time $t_3$ shown in FIG. 22, the value of the register TMR0 represents the time that has elapsed for the index opaque space 122 to pass between the detector 126-1 and emitter 128. As explained above, the length of the index opaque space 122 is approximately three times the length of any of the other opaque spaces 118 or transparent spaces 120. Accordingly, the current (third) TMR0 value is essentially three times the value of any of the previous first and second register TMR0 values. Hence, the value of TOFF is equal to this larger third TMR0 value.

It will then be presumed that in step 513, the microcontroller 108 determines that the DAT flag is at a high level (1) while the CLK flag is rising, and that the microcontroller 108 thus determines that the CLK and DAT signals have a relationship as shown at time $t_3$ in FIG. 22. The processing thus proceeds to the rotation counterclockwise (RCCW) routine beginning at step 534 as shown in FIG. 28.

Because the indexed-encoder 102 is continuing to rotate in the counterclockwise direction, the microcontroller 108 will determine in step 535 that the clockwise rotation flag CWR has already been set to 0. The microcontroller 108 will then proceed to step 536 where it will determine whether the flag TMAX has been set to 1.

Since it is assumed that the state of flag TMAX is equal to 0 (the register TMR0 did not reach its maximum value), the processing will continue to the counterclockwise tests (CCWT) routine for counterclockwise rotation beginning at step 540 as shown in FIG. 30. Specifically, the microcontroller 108 will determine if any of the conditions set forth in steps 541, 542, 543 or 544 have been fulfilled, or if the "no" condition in step 545 has occurred. Because the state of flag CLKRIS is equal to 1, the microcontroller 108 will determine this condition in step 541 and proceed to the counterclockwise count (CCWC) routine beginning at step 548 in FIG. 29 as described above, where the value of register COUNT will be decremented by 1.

The processing will then proceed to the process count/position display (PCPD) processing beginning at step 552 as shown in FIG. 25. The display processing in steps 554 and 555 are skipped because the index opaque space 122 has not been detected and thus the value of COUNT is meaningless, and no displaying will occur. The processing then returns to the read quadrature detector (RQD) step 504.

As the processing repeats beginning at step 504, and proceeds as shown in the flow charts of FIGS. 13 and 14, when the CLK edge condition has been detected in step 507, the processing will proceed to step 510 in FIG. 15. It is presumed that the detected CLK edge condition occurred at time $t_4$ as shown in FIG. 22. This means that the index opaque space numbered COUNT "46" (FIG. 21) is beginning to pass between the emitter 128 and detector 126-1 and thus, begins blocking the light 132 from being detected by detector 126-1. Accordingly, the CLK signal goes to the low value (0).

The microcontroller 108 thus determines in step 511 that the CLK signal is not a CLK rising condition, and proceeds to step 514. In step 514, the microcontroller 108 resets the CLK rising flag CLKRIS to 0, copies the value of register TON2 into register TON1, and copies the value of the register TMR0 into register TON2 and the register TMR0 is reset to "0".

Accordingly, at this time, the values of the registers TON1, TON2 and TOFF are as follows:
TON1=previous TON2=second TMR0 value=$t_2-t_1$
TOFF=third (large) TMR0 value (did not change). $=t_3-t_2$ (FIG. 22)
TON2=current (fourth) TMR0 value=$t_4-t_3$ The processing then proceeds to step 515, where the microcontroller 108 determines the state of flag DAT to determine the direction of rotation of the indexed-encoder 102. Assuming, as indicated above, that the indexed-encoder 102 is continuing to rotate in the counterclockwise direction and the flags CLK and DAT are as shown at time $t_4$ in FIG. 22, the processing continues to the rotation counterclockwise (RCCW) processing beginning in step 534 as shown in FIG. 28. As stated above, it is also presumed that the CLK edge condition detected in step 507 occurred before the register TMR0 reached its maximum value.

Because the indexed-encoder is continuing to rotate in the counterclockwise direction, the microcontroller 108 will determine in step 535 that the clockwise rotation flag CWR has already been set to 0. The microcontroller 108 will then proceed to step 536 where it will determine whether the flag TMAX has been set to 1.

If the state of flag TMAX is 1, the microcontroller 108 will not attempt to detect the index opaque space 122. Rather, the microcontroller will proceed to step 537, where it will reset the state of flag TMAX to 0 and reset the values of registers TON1, TON2 and TOFF to 0 in step 539. In this event, the microcontroller 108 will skip the counterclockwise tests (CCWT) routine beginning at step 540 for detecting the index opaque space 122, and proceed to the counterclockwise count (CCWC) routine beginning at step 548 as shown in FIG. 29.

However, since it is assumed that the state of flag TMAX is equal to 0 (the register TMR0 did not reach its maximum value), the processing will continue to the counterclockwise tests (CCWT) routine for counterclockwise rotation beginning at step 540 as shown in FIG. 30.

Specifically, the microcontroller 108 will determine if any of the conditions set forth in steps 541, 542, 543 or 544 have been fulfilled, or if the "no" condition in step 545 has occurred. If so, the microcontroller 108 will determine that the index opaque space 122 is not yet detectable, and proceed to the clockwise count (CCWC) routine beginning at step 548 in FIG. 29.

Since, as indicated above, the state of flag CLKRIS is not 1, and all the values of TON1, TON2 and TOFF are not 0, the microcontroller will proceed through steps 541, 542, 543, 544 and to step 545, where it will determine if the value of register TOFF is greater than or equal to the combined values of TON1 and TON2. As indicated above, the value of TON1 equals the second TMR0 value, which corresponds to the time period $t_2-t_1$ in FIG. 22 during which the transparent space numbered COUNT "3" passed between the detector 126-1 and the emitter 128. The value of TON2 equals the current (fourth) TMR0 value, which corresponds to the time period $t_4-t_3$ in FIG. 22 during which the numbered COUNT "47" passed between the detector 126-1 and the emitter 128. The value of TOFF equals the third (large) TMR0 value, which corresponds to the time period $t_3-t_2$ in FIG. 22 during which the index opaque space numbered COUNT "2" passed between the detector 126-1 and the emitter 128.

As stated above, it is presumed that the indexed-encoder 102 is rotating at a relatively constant rate. Hence, for reasons similar to those described above with regard to the index opaque space detection during clockwise processing, the microcontroller 108 determines that the value of register TOFF (the large third TMR0 value) is greater than the sum of the values of registers TON1 and TON2 in this case.

Accordingly, the microcontroller 108 proceeds to step 546, where it will set the value of the register COUNT to 46. As shown at time $t_4$ in FIG. 22, this indicates that the opaque space numbered COUNT "46" (FIG. 22) on the indexed-encoder 102 is beginning to pass between the detector 126-1 and emitter 128. The processing will then proceed to step 547, where the microcontroller 108 will set the index detection flag INDEX to "1", thus indicating that the index opaque space 122 has been detected. As stated above, once this flag INDEX has been set to 1, it will remain at 1 until either the power of the apparatus 100 has been turned off or the apparatus 100 has been reset.

The processing will then continue to the process count/position display (PCPD) processing at step 552 in FIG. 25. The microcontroller 108 will determine in step 553 that the flag INDEX is now equal to 1 and thus, will proceed to step 554 where it will calculate POSITION from the value of register COUNT. This POSITION corresponds to the position on the indexed-encoder 102 represented by the register COUNT, and can be equal to the position indicated by the register COUNT (e.g., at this time, position "46"). Alternatively, as described above for the clockwise processing, the indexed-encoder 102 can be used in conjunction with an encoder having a different number of POSITIONS, and the calculated POSITION value can be any quotient of COUNT, as long as that value is an integer.

In step 555, the microcontroller 108 can then output signals representative of the POSITION calculated in step 554 to control the display system 112 to generate a display indicative of the calculated POSITION. Alternatively, the microcontroller 108 can use the calculated POSITION internally for game processing functions, for example. Also, the signals output by the microcontroller 108 that are representative of the calculated POSITION can be provided to another processor, if desired, for further processing, if the application in which the system 100 is being use so requires.

After performing step 555, the processing returns to the read quadrature detector (RQD) step 504 (FIG. 13). Assuming that the indexed-encoder 102 continues to rotate in a counterclockwise direction, the counterclockwise processing described above continues for every CLK edge condition. However, when the indexed-encoder 102 begins rotating in the clockwise direction sufficient to create a CLK edge condition, the clockwise direction processing described above is performed.

Figure 2:
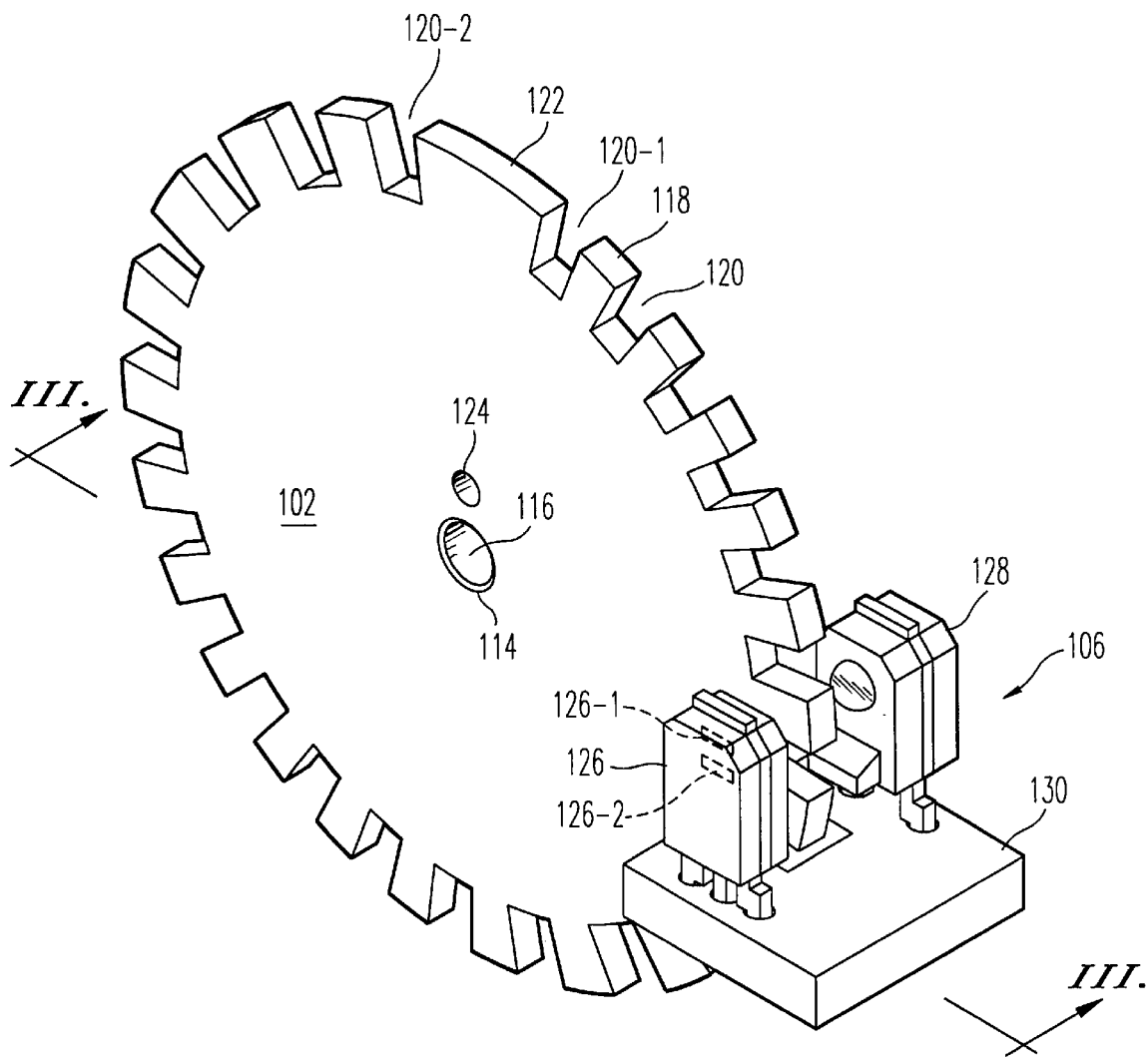
FIG. 2 is an isometric view of an example of an indexed-encoder wheel, and an optical emitter and quadrature detector device of the optical system of the apparatus shown in FIG. 1.
Figure 3:
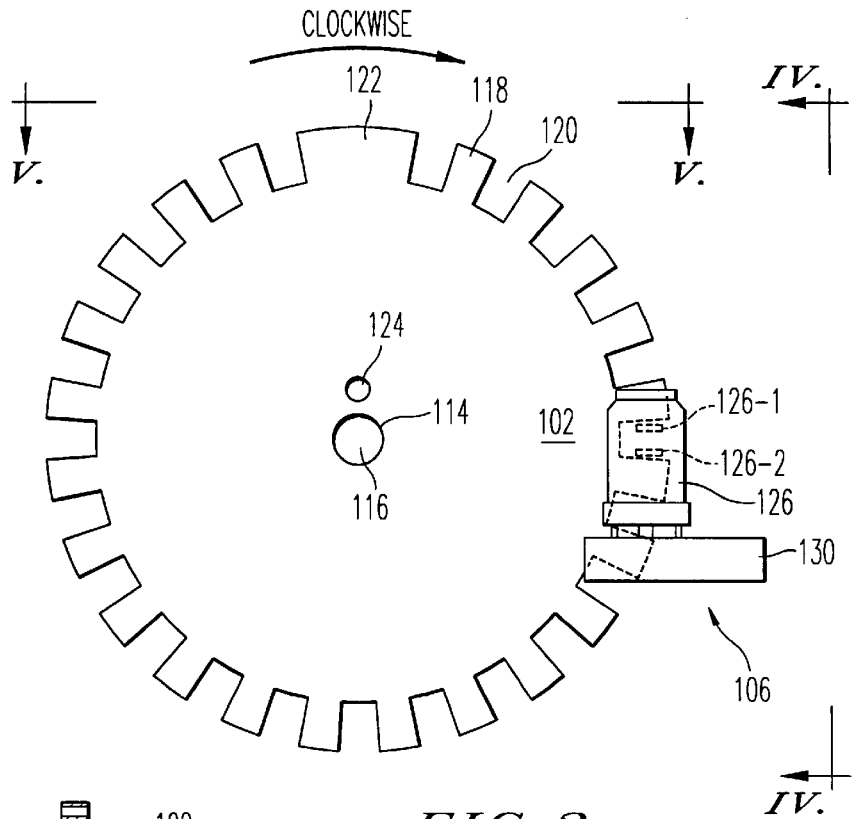
FIG. 3 is a front elevational view of the indexed-encoder wheel and quadrature detector device shown in FIG. 2 as taken along arrows III—III.
Figure 4:
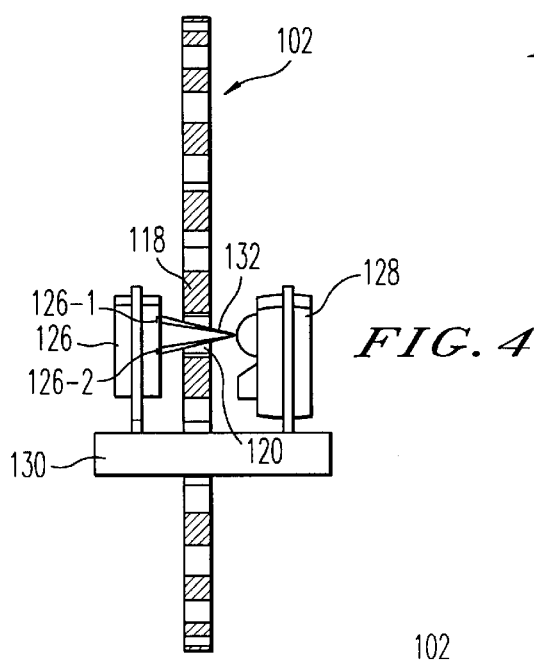
FIG. 4 is a side elevational view of the indexed-encoder wheel and optical emitter and detector devices as taken along lines IV—IV in FIG. 3.
Figure 5:
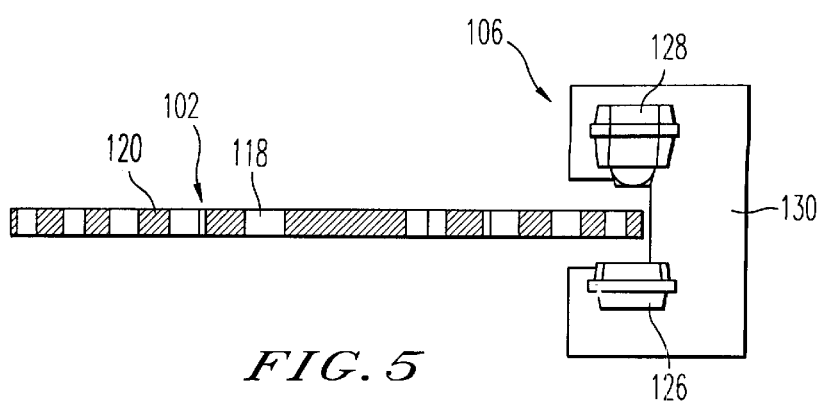
FIG. 5 is a top plan view of the indexed-encoder wheel and optical emitter and detector devices as taken along lines V—V in FIG. 3.

It is also noted that the microcontroller 108 can be programmed with "resolution doubling" software which doubles the resolution of the indexed-encoder 102 without physically changing the indexed-encoder 102, as long as the detectors 126-1 and 126-2 are spaced from each other in electrical quadrature such that their output signals have a relationship as shown in FIGS. 20 and 22. That is, as shown in FIG. 2, the indexed-encoder 102 includes 22 opaque spaces 118 that are equally or substantially equally spaced by transparent spaces 120 such that each opaque space 118 occupies 7.5° or about 7.5° of the circumference of the indexed-encoder 102 and each transparent space 120 occupies 7.5° or about 7.5° of the circumference. Hence, the indexed-encoder 102 provides 7.5° or about 7.5° resolution. If the indexed-encoder 102 is employed in the position sensor system 100, the "resolution doubling" software will enable the microcontroller 108 to detect twice the resolution of the indexed-encoder 102 or, in other words, at 3.75° of resolution. Naturally, this resolution doubling does not occur fully for the index opaque space 122.

As discussed above, the microcontroller 108 increments and decrements the register COUNT, as appropriate, based on the state of flag DAT when the flag CLK is changing from low to high or high to low as shown, for example, at conditions $t_1$, $t_2$, $t_3$, etc., in FIGS. 20 and 22. The changes in signal CLK occur when an opaque space 118 or a transparent space 120 begins to pass between detector 1261 and emitter 128. With indexed-encoder 102 having 7.5° of resolution, this change in status of signal CLK (and the state of flag CLK) therefore only occurs for every 7.5° of rotation of the indexed-encoder 102. The "resolution doubling" software, however, enables the microcontroller 108 to take into account when an opaque space 118 or a transparent space 120 begins to pass between detector 126-2 and emitter 128, as shown, for example, at the rising and falling edges of DAT in FIGS. 20 and 22. In other words, the "resolution doubling" software controls the microcontroller 108 to check the state of flag CLK at the time a change in the state of flag DAT occurs.

As can be appreciated from FIGS. 20 and 22 and the description set forth above pertaining to the manner in which the microcontroller 108 monitors a change in absolute position of the indexed encoder 102 by monitoring the state of flag DAT when the state of flag CLK is changing, by also monitoring the state of flag CLK when the state of flag DAT is changing, the microcontroller 108 is effectively detecting when the indexed-encoder 102 rotates a distance equivalent to one half an opaque space 118 or one half a transparent space 120. The microcontroller 108 thus increments or decrements the register COUNT, as appropriate, based on the state of flag CLK in relation to the change in the state of flag DAT. Accordingly, the resolution that can be achieved by the position sensor system 100 is doubled. Also, as can be appreciated from the above, the microcontroller 108 can determine the direction of rotation based on the state of flag CLK at either a rising or falling edge of DAT. Naturally, the maximum allowable values for register COUNT would need to be doubled for the microcontroller 108 to operate properly in accordance with flowcharts shown in FIGS. 24 and 29. Also, the position calculation in step 554 (FIG. 25) would need to take into account the doubled value of register COUNT in its calculations.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus for determining the absolute position of a movable member with respect to a predetermined location, comprising:
   a first member and a plurality of second members, disposed on the movable member, the first member having a characteristic different from a characteristic of all of the second members;
   a detecting device, adapted to detect when the first member is at the predetermined location and when any of the second members is at the predetermined location, comprising a first detector, disposed at a first location of the detecting device, and a second detector disposed at a second location of the detector device, which is at a distance from the first location along a direction of movement of the movable member, the first detector being adapted to detect the first member and any of the second members when the movable member moves, and to output a first signal indicative thereof, and the second detector being adapted to detect the first member and any of the second members when the movable member moves, and to output a second signal indicative thereof; and
   a position and direction determiner, adapted to determine, based on the first and second signals provided by the first and second detectors, respectively, a direction of movement of the movable member, and a distance in which the movable member has moved relative to the predetermined location after the first member was detected by the detecting device as being at the predetermined location, to determine the absolute position of the movable member with respect to the predetermined location.

2. An apparatus as claimed in claim 1, wherein
   the characteristic of the first member is the length of the first member taken along a direction of movement of the movable member, and the characteristic of each of the second members is the length of each said second member as taken along the direction of movement; and
   the length of the first member is different than the length of each of the second members.

3. An apparatus as claimed in claim 2, wherein
   the length of the first member is greater than the length of each of the second members.

4. An apparatus as claimed in claim 1, wherein the first member is one of opaque and transparent; and
   the plurality of second members includes opaque and transparent members.

5. An apparatus as claimed in claim 1, wherein the detecting device comprises:
   a timer, adaptable to measure an amount of time that elapses from when the first member enters the predetermined location until the first member exits the predetermined location when the movable member moves;
   the detecting device distinguishing the first member from any of the second members based on the measured amount of time.

6. An apparatus as claimed in claim 5, wherein the detecting device further comprises:
   at least one light emitting device, adaptable to emit a light beam toward the movable member; and
   a light detecting device, adaptable to detect the light beam emitted by the at least one light emitting device;
   the timer measuring the amount of time based on periods of detection and non-detection of the light beam by the light detecting device.

7. An apparatus as claimed in claim 1, wherein the position and direction determiner comprises:
   a counter which counts a number of the second members that have been detected by the detecting device as having passed the predetermined location after the first reference member was detected at the predetermined location;
   the position and direction determiner determining the distance of movement of the movable member based on the counted number.

8. An apparatus as claimed in claim 7, wherein
   the counter is an up/down counter which counts up in accordance with the number of second member that have been detected by the detecting device as having passed the predetermined location after the first member was detected at the predetermined location when the movable member is moving in one direction, and which counts down in accordance with the number of second member that have been detected by the detecting device as having passed the predetermined location after the first member was detected at the predetermined location when the movable member is moving in another direction opposite to the one direction.

9. An apparatus as claimed in claim 1, wherein:
   the movable member is a rotating member, and the first and second detectors are disposed at substantially equal distances from an axis of rotation of the movable member.

10. An apparatus as claimed in claim 1, wherein
   the first detector outputs the first signal indicative of detection and non-detection of the first member or any of the second members, the first signal having a first value when the first detectors detects the first member or any of the second members, and a second value, different from the first value, when the first sensor does not detect the first member or any of the second members; and the second detector outputs the second signal indicative of detection and non-detection of the first member or any of the second members, the second signal being out of phase with the first signal, and having a third value when the second detector detects the first member or any of the second members, and a fourth value, different from the third value, when the second detector does not detect the first member or any of the second members.

11. An apparatus as claimed in claim 10, wherein the position and direction determiner comprises:

a determiner which determines a time at which the first signal changes between the first value and the second value; and a comparator which determines the direction of movement of the movable member with respect to the predetermined location based on the value of the first signal at the time of the change in comparison to the value of the second signal at that time.

12. An apparatus as claimed in claim 10, wherein the detector device further comprises at least one light emitting device;

when the movable member moves such that the first member enters a path along which the light travels from the at least one light emitting device to the first detector, one of the following occurs:

the first member substantially prevents the first detector from detecting the light emitted by the at least one light emitting device, so that the first detector outputs the first signal having the first value; and the first member substantially permits the first detector to detect the light emitted by the at least one light emitting device, so that the first detector outputs the first signal having the first value;

when the movable member moves such that any of the second members enters a path along which the light travels from the at least one light emitting device to the first detector, one of the following occurs:

said any of the second members substantially prevents the first detector from detecting the light emitted by the at least one light emitting device, so that the first detector outputs the first signal having the first value; and said any of the second members substantially permits the first detector to detect the light emitted by the at least one light emitting device, so that the first detector outputs the first signal having the first value;

when the movable member moves such that the first member enters a path along which the light travels from the at least one light emitting device to the second detector, one of the following occurs:

the first member substantially prevents the second detector from detecting the light emitted by the at least one light emitting device, so that the second detector outputs the second signal having the third value; and the first member substantially permits the second detector to detect the light emitted by the at least one light emitting device, so that the second detector outputs the second signal having the third value; and when the movable member moves such that any of the second members enters a path along which the light travels from the at least one light emitting device to the second detector, one of the following occurs:

said any of the second members substantially prevents the second detector from detecting the light emitted by the at least one light emitting device, so that the second detector outputs the second signal having the third value; and said any of the second members substantially permits the second detector to detect the light emitted by the at least one light emitting device, so that the second detector outputs the second signal having the third value.

13. A method for determining the absolute position of a movable member with respect to a predetermined location, the movable member comprising a first member and a plurality of second members, the first member having a characteristic different from a characteristic of all of the second members, comprising the steps of:

detecting when the first member is at a first position in the predetermined location, and when any of the second members is at the first position, and providing first indicators indicative of detection of the first and second members at the first position;

detecting when the first member is at a second position in the predetermined location, and when any of the second members is at the second position, and providing second indicators indicative of detection of the first and second members at the second position, the second position being at a distance from the first location along a direction of movement of the movable member; and determining, based on the first and second indicators provided by the detecting steps, a direction of movement of the movable member, and a distance in which the movable member has moved relative to the predetermined location after the first member was detected as being at the predetermined location, to determine the absolute position of the movable member with respect to the predetermined location.

14. A method as claimed in claim 13, wherein the characteristic of the first member is the length of the first member taken along a direction of movement of the movable member, and the characteristic of each of the second members is the length of each said second member as taken along the direction of movement;

the length of the first member is different than the length of each of the second members; and the distinguishing step comprises the step of distinguishing the first member from any of the second members based on the length of the first member.

15. A method as claimed in claim 13, wherein the distinguishing step comprises the steps of:

measuring an amount of time that elapses from when the first member enters the predetermined location until the first member exits the predetermined location when the movable member moves; and distinguishing the first member from any of the second members based on the measured amount of time.

16. A method as claimed in claim 15, wherein the distinguishing step further comprises the steps of:

emitting a light beam toward the movable member; and detecting the emitted light beam; and wherein the measuring step comprises the step of measuring the amount of time based on periods of detection and non-detection of the light beam during the light beam detecting step.

17. A method as claimed in claim 13, wherein the determining step comprises the steps of:

counting a number of the second members that have been detected as having passed the predetermined location after the first member was detected at the predetermined location; and determining the distance of movement of the movable member based on the counted number.

18. A method as claimed in claim 17, wherein the counter step comprises the steps of:

counting up in accordance with the number of second member that have been detected as having passed the predetermined location after the first member was detected at the predetermined location when the movable member is moving in one direction; and counting down in accordance with the number of second member that have been detected as having passed the predetermined location after the first member was detected at the predetermined location when the movable member is moving in another direction opposite to the one direction.

19. An apparatus as claimed in claim 13, wherein:

the movable member is a rotating member, and the first and second positions are disposed at substantially equal distances from an axis of rotation of the movable member.

20. A method as claimed in claim 13, wherein the determining step further comprises the steps of:

outputting a first signal indicative of detection and non-detection of the first member or any of the second members at the first position, the first signal having a first value when the first member or any of the second members is detected at the first position, and a second value, different from the first value, when the first member or any of the second members are not detected as being at the first position; and outputting a second signal indicative of detection and non-detection of the first member or any of the second members, the second signal being out of phase with the first signal, and having a third value when the first member or any of the second members is detected at the second position, and a fourth value, different from the third value, when the first member or any of the second members are not detected as being at the second position.

21. A method as claimed in claim 20, wherein the determining step comprises the steps of:

determining a time at which the first signal changes between the first value and the second value; and determining the direction of movement of the movable member with respect to the predetermined location based on the value of the first signal at the time of the change in comparison to the value of the second signal at that time.

* * * * *